(12) United States Patent
Nakamura et al.

(10) Patent No.: US 9,906,291 B1
(45) Date of Patent: Feb. 27, 2018

(54) HETEROGENEOUS SPACECRAFT NETWORKS

(71) Applicant: The United States of America, as Represented by the Administrator of the National Aeronautics and Space Administration, Washington, DC (US)

(72) Inventors: Yosuke Nakamura, Moffett Field, CA (US); Nicolas T. Faber, Moffett Field, CA (US); Chad R. Frost, Sunnyvale, CA (US); Richard L. Alena, San Francisco, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/056,970

(22) Filed: Feb. 29, 2016

Related U.S. Application Data

(60) Provisional application No. 62/121,937, filed on Feb. 27, 2015.

(51) Int. Cl.
  *H04B 7/185* (2006.01)
(52) U.S. Cl.
  CPC ................. *H04B 7/18521* (2013.01)
(58) Field of Classification Search
  CPC ................. H04L 67/12; H04B 7/18521
  See application file for complete search history.

(56) References Cited

U.S. PATENT DOCUMENTS

| 8,693,388 B2* | 4/2014 | Jansson .............. H04B 7/18582 370/316 |
| 2010/0052948 A1* | 3/2010 | Vian ...................... G07C 5/008 340/963 |
| 2014/0286235 A1* | 9/2014 | Chang ................. G01S 13/9303 370/316 |

* cited by examiner

*Primary Examiner* — Melvin Marcelo
(74) *Attorney, Agent, or Firm* — Christopher J. Menke; Robert M. Padilla; Mark P. Dvorscak

(57) ABSTRACT

The present invention provides a heterogeneous spacecraft network including a network management architecture to facilitate communication between a plurality of operations centers and a plurality of data user communities. The network management architecture includes a plurality of network nodes in communication with the plurality of operations centers. The present invention also provides a method of communication for a heterogeneous spacecraft network. The method includes: transmitting data from a first space segment to a first ground segment; transmitting the data from the first ground segment to a network management architecture; transmitting data from a second space segment to a second ground segment, the second space and ground segments having incompatible communication systems with the first space and ground segments; transmitting the data from the second ground station to the network management architecture; and, transmitting data from the network management architecture to a plurality of data user communities.

18 Claims, 20 Drawing Sheets

Scenario I: Non-HSN (Conventional)

HETEROGENEOUS SPACECRAFT NETWORKS

CROSS-REFERENCE TO RELATED APPLICATION

This application claims the benefit of U.S. Provisional Application No. 62/121,937, filed Feb. 27, 2015. The above-identified U.S. provisional patent application is hereby incorporated by reference in its entirety.

ORIGIN OF THE INVENTION

The invention described herein was made by one or more employees of the United States Government and may be manufactured and used by or for the Government of the United States of America for governmental purposes without the payment of any royalties thereon or therefore.

FIELD OF THE INVENTION

The present invention relates to network environments, and more particularly, to heterogeneous spacecraft networks in which spacecraft from different missions and institutions can communicate with each other at low-cost and with low impact on overall system resources.

BACKGROUND OF THE INVENTION

Currently, space communication protocols like CCSDS are space-specific, and space dedicated transponders were used. Also, networking missions in space are homogeneous, and require higher cost technology. That is, each spacecraft project has their own policies and technologies which inhibits seamless spacecraft to spacecraft communication.

What is needed, and what the present invention provides, is a fully networked, heterogeneous spacecraft infrastructure that changes the way international space agencies and space-focused business entities utilize space.

SUMMARY OF THE INVENTION

Heterogeneous Spacecraft Networks (HSNs) are network environments in which spacecraft from different missions and institutions can communicate with each other at low-cost and with low impact on overall system resources. HSNs may use ground-based open standard protocols, such as the IEEE 802 family of standards, for space-to-space and space-to-ground communications. These standards enable spacecraft in LEO to have an ad-hoc data relay capability between each spacecraft.

A novel and unique feature of HSNs are their capability of simultaneous complementary and correlated data collection from a large set of distributed spacecraft, and giving an additional value to the original missions. By using HSNs, total communication throughputs of space missions can be increased.

In accordance with one aspect of the invention, there is provided a heterogeneous spacecraft network including a network management architecture to facilitate communication between a plurality of operations centers and a plurality of data user communities. The network management architecture includes a plurality of network nodes in communication with the plurality of operations centers. The plurality of nodes include space segments and ground segments.

Space segments include a spacecraft, a constellation of spacecraft, a formation flight of spacecraft, or a swarm of spacecraft. The space segments include incompatible communication systems, where the incompatible communication systems of the space segments do not permit communication between the space segments. The network architecture includes a standardized communication system capable of facilitating communication between the space segments. The standardized communication system uses WiFi based on the IEEE 802 family of network standards. At least one space segment includes a WiFi transceiver.

Ground segments include a mission operations center, a science operations center, or a ground station. The ground segments include incompatible communication systems, where the incompatible communication systems of the ground segments to not permit communication between the ground segments. The standardized communication system is capable of facilitating communication between the ground segments. The standardized communication system uses WiFi based on the IEEE 802 family of network standards. At least one ground segment includes a WiFi transceiver.

The network management architecture facilitates communication between the WiFi transceivers of the space and ground segments and the plurality of data user communities.

In accordance with another aspect of the invention, there is provided a method of communication for a heterogeneous spacecraft network. The method includes transmitting data from a first space segment to a first ground segment; transmitting the data from the first ground segment to a network management architecture; transmitting data from a second space segment to a second ground segment, the second space and ground segments having incompatible communication systems with the first space and ground segments; transmitting the data from the second ground station to the network management architecture; and transmitting data from the network management architecture to a plurality of data user communities.

In accordance with a further aspect of the invention, there is provided a method of communication for a heterogeneous spacecraft network. The method includes transmitting data from a first space segment to a second space segment using WiFi based on the IEEE 802 family of network standards; transmitting the data from the second space segment to a ground segment using WiFi based on the IEEE 802 family of network standards; transmitting the data from the ground station to a network management architecture; and, transmitting the data from the network management architecture to a plurality of data user communities.

BRIEF DESCRIPTION OF THE DRAWINGS

A more complete understanding of the present invention, and the attendant advantages and features thereof, will be more readily understood by reference to the following detailed description when considered in conjunction with the accompanying drawing wherein.

DETAILED DESCRIPTION OF THE INVENTION

Figure 1:
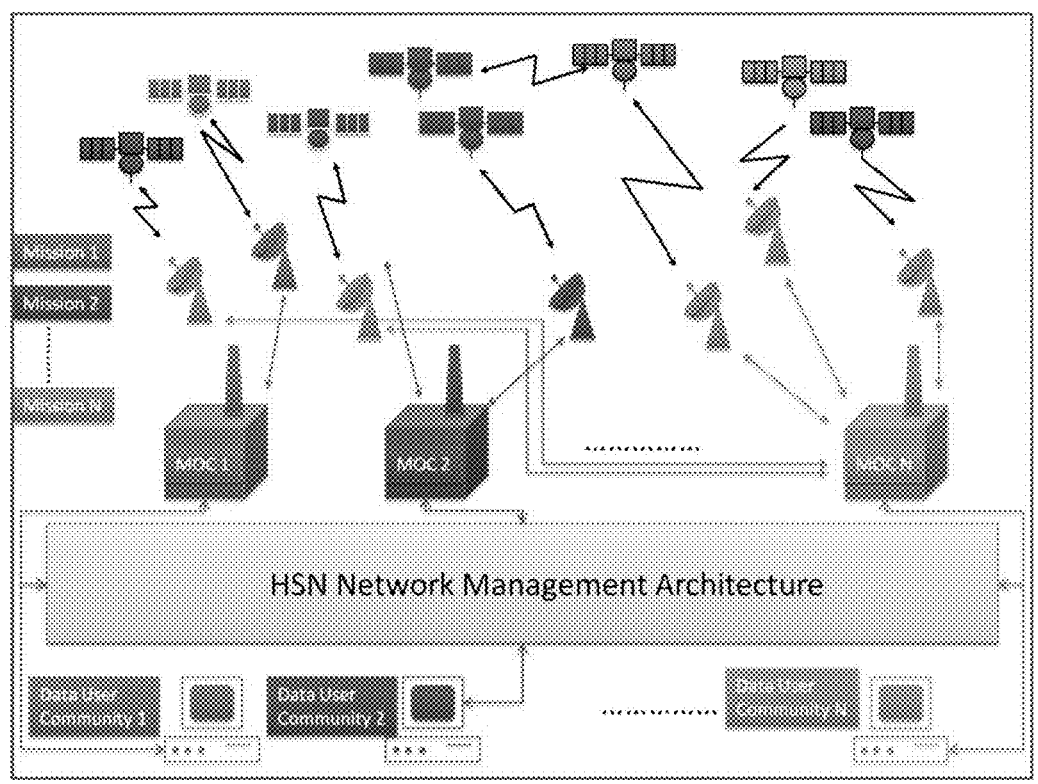
FIG. 1 illustrates Heterogeneous Spacecraft Networks (HSNs) in its most general form.

The present invention describes Heterogeneous Spacecraft Networks (HSNs) in which spacecraft from different missions and institutions can communicate with each other at low-cost and with low impact on overall system resources. HSNs use ground-based open standard protocols, such as the IEEE 802 family of standards, for space-to-space and space-to-ground communications. These standards enable spacecraft in LEO to have an ad-hoc data relay capability between each spacecraft. Using heterogeneous space-to-ground networks is also a part of the operation of HSNs.

I. A Cost-Effective, Multi-Institutional Earth Observation Platform

In recent years the Mission Design Center (MDC) at NASA Ames Research Center has been studying mission concepts involving clusters of small spacecraft capable of providing cost-effective solutions in orbit compared to space missions involving only a single larger spacecraft. Low-cost networks of small spacecraft are a viable alternative to large budget Earth observation or space exploration missions producing significant scientific return for often moderate development efforts and short lead times. The scientific value (and hence the cost effectiveness) of small multi-spacecraft missions is further increased if the network of spacecraft is allowed to be heterogeneous. Heterogeneous Spacecraft Networks (HSNs) are defined to be networks of spacecraft having different operators or originating from different missions that are able to communicate with each other in a low-cost manner and with low impact on overall system resources.

A HSN incorporates both the space segment and ground segment for an end-to-end solution. The strength of the HSN approach is illustrated by presenting a general concept for a HSN in LEO as well as a case study showcasing the value of such a network. In particular, the case study examines the feasibility of a low-cost, multi-institutional network of small spacecraft acting as a next-generation Earth Observation (EO) platform and focusing on ad-hoc data relay to maximize throughput. In the simulation, it is shown that the downlink throughput of an HSN can be larger by an order of magnitude compared to the conventional scenario where no networking capability exists.

Other benefits of using a HSN as a next-generation increment of existing capabilities include increased revisit frequencies as well as the ability to collect correlated data simultaneously from distributed locations around the globe using either conventional or fractionated spacecraft. Key performance requirements are presented for a HSN in order to produce a desirable scientific return and present a concept of operations (ConOps) for the practical implementation. In the ConOps the required performance of the inter-satellite and space-to-ground links is provided, and an overview of the associated ground station network is described. An overview of the network management techniques required to operate and control the network on a day-to-day basis is provided, and the issues of network configuration, network discovery and security, as well as fault and performance management are addresses.

A goal in space mission design is to maximize cost-effectiveness. A popular approach to achieve this is to fly small spacecraft with low or medium performance instruments whenever large and sophisticated instruments are not strictly necessary for mission success. This trend has been made possible through the results recently achieved in the miniaturization of technology along with the serial production of small spacecraft platforms and the availability of Commercial Off-The-Shelf (COTS) and consumer electronics for space missions. Evidence supporting the evolution can be found in the large number of low-cost small spacecraft missions that have been launched in recent years. However, it should be noted that the savings in development costs achieved by using smaller spacecraft do not come for free. The savings are typically associated with a perceptible decline in the scientific return of the mission.

A means to address the moderate scientific return of small spacecraft missions is to take advantage of the scalability of the design process of small spacecraft. Although small spacecraft may not replace their larger counterparts in the foreseeable future, it is usually acknowledged that small spacecraft missions involving multiple units are a promising way to achieve considerable scientific value at low cost. An example of this is the Edison Demonstration of Smallsat Networks (EDSN) mission developed by NASA Ames Research Center. The goal of EDSN is to demonstrate a swarm of small, inexpensive satellites with novel on-orbit communications capabilities and their suitability to act as a future platform for distributed space weather measurements. The cost of the overall EDSN project is between $10 and $20 million for a mission lifetime of 24 months.

Although the cost of missions such as EDSN is comparatively low, it remains to be seen if such missions are the final answer to the question of cost-effectiveness. Cost-effectiveness can be increased further provided that disruptive changes are introduced to the way how space missions are conducted today. Heterogeneous Spacecraft Networks (HSNs), loosely defined as being multi-institutional networks of spacecraft able to communicate with each other in a low-cost manner, are means to achieve greater cost-effectiveness.

A. The HSN

The Mission Design Center (MDC) at NASA Ames Research Center investigated whether if spacecraft that are procured, built, launched and operated by different multi-institutional players can be integrated into a single network for various common mission objectives. The idea is to have each institution procure one or several spacecraft in the conventional way but with the hardware necessary to become a member of a large in-orbit cloud of multi-institutional spacecraft. Each spacecraft may be different in design and may be part of a different mission. However, all of the spacecraft have the possibility to join the cloud whenever desired and work towards a common objective with the other units defining the network. As such one may speak of a network of spacecraft that is truly heterogeneous in nature since both the origin of the nodes making up the network and the mission on which the nodes are flying may be different. The purpose for which the network is established varies on a case by case basis. The single system defining the network is the communications architecture which ensures both efficient space-to-ground (S-G) and space-to-space (S-S) communication between all the space and ground nodes involved. Features of what is described as a Heterogeneous Spacecraft Network (HSN) are defined in Table 1. The Table compares these features to the ones of conventional (or homogeneous) spacecraft networks such as EDSN.

TABLE 1

Key features of a Heterogeneous Spacecraft Network (HSN) as opposed to a conventional spacecraft network (such as e.g., EDSN).

| Conventional (homogeneous) spacecraft networks | Heterogeneous Spacecraft Networks (HSNs) |
|---|---|
| Single institution: spacecraft all procured by the same institution and built by the same manufacturer | Multi-institutional: spacecraft procured by different institutions and possibly built by different manufacturers |
| Single operator: spacecraft all operated by the same operator using a single ground segment | Multiple operators: not all spacecraft are operated by the same operator. The ground segments used are different. |
| Single mission: spacecraft all part of the same mission | Possibly multiple missions implying various degrees of mission criticality of the HSN. The spacecraft making up the HSN may be part of different missions and the mission criticality of the HSN may therefore differ from one spacecraft to the next (see also Table 2) |
| National endeavor | Can be a multi-national project |
| Spacecraft built using the same technology and components | Technology and components may differ significantly between spacecraft |
| Dedicated communications hardware with often proprietary network protocol suite. | COTS technology to enable HSN communication. All is based on open standards |

As previously mentioned, one of the defining elements of a HSN is that the spacecraft making up the network may or may not originate from different missions. From this observation it follows naturally that the criticality of the HSN to meet the mission objectives of all or part of the nodes can be different across the network. It is therefore useful to differentiate between the different situations in which an HSN may be set up in practice. What follows is an overview of applications in which to establish a HSN. These applications are categorized according to the level of criticality of the network to meet the various mission objectives of the individual nodes.

For instance, the HSN may be the defining element of a single space mission only, in which all the different institutions providing the nodes have taken part in the definition of the network objectives prior to launch. Institutions have agreed on the establishment of the HSN a priori in order to meet their common objectives. The HSN is in this case a key element of the mission and a requirement for mission success. The purpose for setting up the HSN is identical to the mission objective of each node. A practical example of this is a mission aiming to set up a dedicated next-generation Earth Observation (EO) platform. A large number of spacecraft is launched in a broad range of predetermined orbits to perform distributed measurements with the objective to obtain globally correlated data. Each node of the HSN collects data for the same mission and the HSN is used to maximize the benefits for each institution involved in the project. This type of HSN is denominated in what follows a "primary HSN". Other applications of primary HSNs range from low-cost EO missions for small spacecraft up to elaborated concepts for exploration such as large swarms of fractionated spacecraft on an expedition through the solar system.

On the other hand, one may also have the situation in which the HSN is not required at all to guarantee mission success of any of the nodes involved in the network. The mission objectives of all of the nodes cannot be brought directly into relation with the purpose for which the HSN has been set up. No planning to set up a network has been carried out prior to launch and the HSN is set up in orbit impromptu. The HSN is in that case an auxiliary asset and its purpose is merely to complement or augment an independent and already existing capability. This type of HSN is called a "secondary HSN". A possible application for such HSNs may be added value data exchange between operators of different space missions. For example, HSNs may provide a simple and low-cost opportunity to augment existing space situational awareness (SSA). Spacecraft originating from various operators and missions have the possibility to exchange their orbital data on a voluntary basis through a common communications architecture. Publicly available data is produced that may be valuable for space traffic management as well as collision assessment and avoidance.

Another application of secondary HSNs, closely related to the above-mentioned idea of voluntary data exchange, is the powerful idea of voluntary data relay or file sharing. It is not impossible to build a platform in space centered around protocols such as BitTorrent supporting the practice of peer-to-peer file sharing and the distribution large amounts of data.

Finally, there are various situations in between where the HSN is neither of primary nor of secondary type. Such architectures, in which the HSN is critical to the mission objective of part of the nodes but not all, are labeled to be "hybrid HSNs". Some nodes have an independent primary mission in addition to their role in the network, others do not and their purpose in orbit is exclusively to increase the performance of the network. Again, a straightforward example of an application for a hybrid HSN is data relay. However, now some spacecraft act as pure data relay nodes that have been launched specifically for that purpose. Other nodes have not been designed primarily to be part of a HSN and have been furbished with the HSN communications hardware just to be equipped should a data relay opportunity arise at later times during mission lifetime. The probe nodes perform their mission specific measurements and forward the data to the relay nodes. In the long term, possible applications may include interplanetary data relay as well as the vision of the interplanetary Internet. The categorization of HSNs is summarized in Table 2 below.

TABLE 2

Types of HSNs, associated nomenclature and possible applications.

| Type of HSN | Characteristics | Possible Applications |
|---|---|---|
| Primary HSN | The network is of critical importance for mission success. All spacecraft fly on the same mission and the establishment of the HSN is required for mission success. All the nodes making up the HSN have been launched to meet the same mission objectives. | Dedicated EO platform Swarms of fractionated spacecraft in Earth orbit and beyond |
| Secondary HSN | The network is not of critical importance to any of the nodes. All spacecraft fly on different missions and the HSN is not a critical element of any of these missions. Each node making up the network is part of a mission that cannot be directly brought into relation with the purpose for which the HSN has been set up. | Added value data exchange (space traffic management, collision avoidance) Ad-hoc data relay and file sharing |
| Hybrid HSN | The network is critical to the mission success of part of the nodes. The other nodes have an independent primary mission that does not necessarily require the HSN to meet its objectives. | Same as for primary and secondary HSNs Data relay (Earth orbit, interplanetary) Small spacecraft swarms in an escort role to a large spacecraft mission Interplanetary Internet |

The purpose of a heterogeneous spacecraft network is to enable low-cost space-to-space (S-S) and space-to-ground (S-G) communication across spacecraft from different institutions, manufacturers, operators or missions. FIG. 1 shows a conceptual sketch of this situation. Note that the picture does not represent a particular architecture for a given mission scenario. The idea behind the sketch is rather to visualize the concept of HSN in its most general form. N independent missions are shown each of which is marked by a different color. Each mission is made up of a space segment comprising one or more spacecraft and a ground segment comprising a set of ground stations, a Mission Operations Center (MOC) and a Data User Community (DUC). Within each mission the different spacecraft may be procured by different institutions and built by different manufacturers. This additional potential variety in spacecraft origin within each mission is highlighted by the use of different colors to outline the icons depicting a spacecraft.

The particular case where N=1 in FIG. 1 refers to what has been called earlier a primary HSN. There is only one space mission and the heterogeneity of the network stems solely from the fact that the spacecraft haven been procured, built and launched by different institutions. Secondary and hybrid HSNs provide the additional complexity of being composed of spacecraft originating from different missions. They are operated by different MOCs and have different data user communities as customers. The case where N>1 in FIG. 1 represents the architecture of this type of HSNs.

Clearly, the operations related to secondary and hybrid HSNs are not trivial. Recall that in classical space operations without HSNs the operations of each of the N missions are independent and do not interfere with each other. The spacecraft are operated by the respective MOC in charge of Telemetry, Tracking and Command (TT&C) and transfer of mission data to the respective DUC. For secondary and hybrid HSN this simple picture is not valid any more due to the heterogeneity of the nodes. No single MOC is in a position to oversee and manage the complex operations associated with the entire network. The most prominent reason for this is the lack of knowledge each MOC has about the internals of the other N−1 missions. For example, typically no MOC disposes of the ground station schedule of spacecraft other than its own.

The solution to manage the operations of secondary and hybrid HSNs is to install a comprehensive Network Management Architecture (NMA). The NMA is depicted in FIG. 1 as an additional layer between the MOCs and the DUCs and takes care of any activity related to the management of the network.

The appeal of the HSN concept depends on the performance and the robustness of the communications solution. The ability of the nodes to connect to each other on a plug and play basis and to perform seamless S-S and S-G communication is at the heart of the concept and constitutes the backbone of the HSN architecture illustrated by FIG. 1.

Since the goal of HSNs is to leverage the interest of the global space community and to set the framework for the broadest participation possible, the design of the communications solution must be suitable to a large set of different spacecraft platforms. Also special attention must be paid to the limitations of small spacecraft platforms since small spacecraft are probably the most appropriate means to field the first HSN demonstration missions.

This requirement for the communications system to be low-cost, compatible with a broad range of different platforms, not demanding in terms of spacecraft SWaP resources (Size, Weight and Power), and accessible to a broad range of multi-institutional players drives the design solution away from conventional space communications technology which comes at significant cost and often favors proprietary technology not open to the broad public. Instead, a more versatile solution must be preferred based on publicly available technology and existing international standards in order to facilitate interoperability.

A number of authors have advocated the advantages of using existing Commercial-Off-The-Shelf (COTS) communications technology in space based on the successful track record such technology has on ground. Discussed later is a trade study on the various networking technologies that are popular on ground today such as WiFi, WCDMA, IEEE 802.15.4 and ZigBee. Performance indicators and figures of merit have been derived in order to identify which technology is suitable for HSN operations in space. Emphasis is placed on the particular case of small spacecraft in LEO, and the performance of one of the most popular candidate technologies to enable HSNs, namely WiFi, is quantified.

Later disclosure builds on these findings and concentrate on HSNs of small spacecraft in LEO using WiFi (see also Table 3). The focus is on Low-Earth Orbit since this is the most likely environment in which the advantages of HSNs may be demonstrated in the near future.

B. Concept of Operations for a HSN of Small Spacecraft in LEO

Later in this description of the invention, it has been shown that the communication range of WiFi technology can be extended to 3100 km for S-G links and 550 km for S-S links provided some basic assumptions on the characteristics of the ground and space nodes are valid. This finding is used to design a Concept of Operations (ConOps) for an EO HSN in LEO. The purpose of the HSN is to have a voluntary ad-hoc data relay capability between each spacecraft participating in the network. There are N independent EO missions each of which has its own internal mission objectives and its proper mission data to be transferred to Earth. Each mission is made up of one small spacecraft, one ground station, one MOC and one data user community (see FIG. 1). The challenges to overcome to connect these missions into a data relay network are addressed. The purpose of the network is to have every mission benefit from an increased volume of mission data that can be downlinked to Earth.

Mission element: Spacecraft—The HSN communications hardware is designed to suit typical small spacecraft missions, in particular microsatellite and cubesat missions. In the present ConOps all the required hardware can be flown on a cubesat with a 6 U form factor. The spacecraft has two transceivers, for example. The first is a conventional cubesat transceiver in S-band acting as the primary communications device for each mission. Its use is straightforward and operations are not examined in more detail in this work.

TABLE 3

| IEEE 802.11 standard (WiFi). | |
| --- | --- |
| Frequency | 2.4 GHz |
| Modulation | FHSS or DSSS |
| EIRP | 1 W (FCC limitation) |
| Standard data rate | Up to 54 mbps |
| HSN data rate | 256 kbps @ 3100 km range |

The second transceiver is based on WiFi technology. This transceiver has been mounted on the spacecraft as an additional low-cost communications capability enabling ad-hoc communication between individual missions whenever an opportunity arises. Key characteristics of the spacecraft platform are given in Table 4. Note that the WiFi transmitter must have a power equal or larger than 10 W peak to perform S-G and S-S links at ranges of 3100 km and 550 km respectively. An ADCS capability is needed for each spacecraft to ensure reliable S-S links can be performed with a 10 dBi onboard antenna.

TABLE 4

| Spacecraft specifications. | |
| --- | --- |
| Type | 6 U cubesat |
| Mass | ≥10 kg |
| Primary transceiver | Conventional S-band |
| Secondary transceiver | WiFi (S-band @ 2.4 GHz) |
| WiFi transmitter power | ≥10 W peak |
| Antenna gain | 10 dBi |
| Antenna transmitting power | <30 dBm |
| Antenna pattern | Toroid |
| WiFi S-G link range | 3100 km |
| WiFi S-S link range | 550 km |
| ADCS capability | yes |

Mission element: Ground stations—Ground stations suitable for the concept range from university ground stations to large ground systems used for high-end missions. In this work, focus is put on small spacecraft ground stations that can be built and operated in an academic setting. Features are given in Table 5. The upper limit of 30 dBm for the antenna transmitting power is dictated by current WiFi transmitter hardware limitations.

It is assumed that each mission has a ground station that can dedicate a significant amount of its schedule to the mission and the additional passes due to other members of the HSN. The augmented downlink capability enabled through the HSN can only be achieved if the ground station is available to service each spacecraft that is part of the network. This may not always be possible. The roles of ground stations is discussed further in the Scheduling subsection below.

TABLE 5

| Ground station specifications. | |
| --- | --- |
| Antenna type | Parabolic dish |
| Antenna diameter | 1 m |
| Antenna gain | 35 dBi |
| Antenna transmitting power | <30 dBm |
| Antenna pattern | Highly directional |
| LEO tracking capability | Yes |

Figure 3:
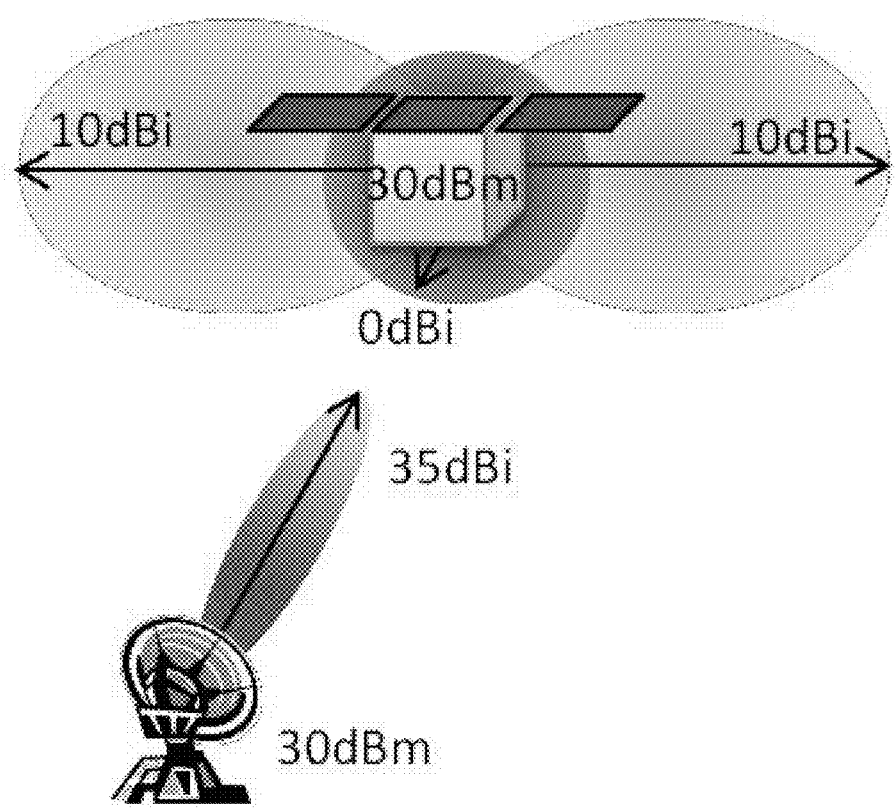
FIG. 3 illustrates a S-G link using WiFi transceiver technology, where the solution depicted relies on the spacecraft and ground station architecture of Table 4 and Table 5.

FIG. 3 illustrates a S-G link using WiFi transceiver technology. The solution depicted relies on the spacecraft and ground station architecture of Table 4 and Table 5.

Mission element: MOCs—The MOCs are the centers from which each individual mission is operated. The MOC is the single authority in control of the mission and is ultimately responsible for mission success. The setting up of an HSN does not alter the role and responsibilities of the MOCs. The HSN is a network that can be joined and left on a voluntary basis and the MOC remains in charge of its mission internal assets at all times. All decision-making remains under the auspices of the MOCs. The Network Management Architecture (NMA) is a hub for the coordination of network resources between the MOCs and acts as a monitor and facilitator for an efficient and fair utilization of the HSN.

Mission element: Data User Communities—The Data User Communities (DUCs) are the final customers to be serviced by each mission. The purpose of establishing a HSN is to increase the customer satisfaction of the DUCs. The scientific value of each mission, as measured amongst others by the amount of data received by each DUC, is to be increased.

Wireless communications standards support different connection topologies. An overview of the topologies are discussed later. They typically progress from point-to-point, to star and then tree type topologies. Conventional RF space communication links conform to the point-to-point model, that is, from a single spacecraft to the ground station, or from one spacecraft to another. WiFi, however, can be used either in ad-hoc or in infrastructure topology. WiFi in ad-hoc mode is an example of point-to-point networks. WiFi operating in infrastructure mode is an example of a star configuration, with a so-called access point acting as the central point of the star. All wireless access is mediated and coordinated by the access point. All client nodes must see the access point in order to participate in the subnet. Note that actual data transfer between clients is done directly, not through the access point.

WiFi uses the SSID to identify the network and devices with the same SSID either connect to the access point (infrastructure mode) or use ad-hoc mode to setup direct connections with each other. A beacon packet is used for coordinating the network, periodically determining network membership and assigning time slots for better utilization of the medium. All data transfers are direct from source to destination, with the access point only coordinating the transfers. To have WiFi work properly, it is essential that all the nodes of the network receive and respond to the beacons from the access point.

The WiFi topologies are thus either a star network or a collection of ad-hoc point-to-point links. WiFi can support space-to-space links using ad-hoc mode. If the ground station is an access point in infrastructure mode, the ground station is the central node of the star.

In the most general case, the choice of the most suitable topology depends on the desired mission configuration, the exact number of satellites and ground stations to be part of the network, the average separation between the spacecraft and the amount of data throughput aimed for. Point to point is the only solution for most simple missions where there are simply not enough nodes to create any other type of network. Star topology is best for networks where a central node, often the ground station desires to communicate with multiple spacecraft located in close proximity, like a closely coupled cluster of satellites. To keep things simple, WiFi is used in ad-hoc mode in the simulation described farther below.

One of the main challenges related to efficient utilization of the network is scheduling. The challenge is to determine the dates of all the passes of each spacecraft, not only for the mission internal ground stations (as would have been the case in conventional mission operations without HSN) but for all the ground stations that are part of the network. Furthermore, in order to allow S-S communication, the scheduling algorithm also needs to predict the visibility conditions between all the available space nodes.

The problem of scheduling cannot be addressed by a single MOC because no one MOC possesses all the information required to do the computations. For instance, it cannot be assumed that each MOC has access to the most recent information about the orbital position of a spacecraft other than its own. Furthermore, the appeal of the HSN concept relies heavily on the ability to use the network in a seamless manner. No MOC should be faced with the additional burden of computing schedules for assets that are not their own. The task of scheduling communication opportunities within the network should be performed by the NMA using a dedicated scheduling algorithm.

Activity planning comprises the planning and execution of the commands needed to perform the link within a given communications window. As mentioned earlier, commanding authority may be retained under the exclusive responsibility of the MOC. It pertains to the MOCs to decide whether scheduled communication opportunities are seized or not. Decisions regarding their assets must remain under the auspices of the MOC.

Data policy and data management is another important aspect of any operational concept related to HSNs. Within each mission there are two types of data: housekeeping and mission data. Both types of data should not, for example, be transferred through the HSN, mainly because housekeeping data is of interest to the MOCs only and is not a quantity the throughput of which needs to be increased. Focus is on maximizing the throughput of mission data.

The mission data needs to be provided to the DUCs in a seamless way. However, the routing to the end user differs from the conventional case where no HSN is present since MOCs now receive data that does not belong to their own mission. Data delivery to the appropriate DUC can be performed through the Internet using a secure file transfer protocol. This is one of the tasks managed by the NMA presented farther below.

Three layers of data security are provided by the WiFi standard. They are encoded in different layers of the OSI stack providing different range of services.

1. Application layer: a log-in based authentication
   ensures controlled and authorized access to different applications, and users can be prevented access depending on their clearance to use a particular application;
   helps in maintaining a database of all active and passive users to monitor the usage pattern of the application.
2. Network layer: Virtual Private Networks (VPNs) provide data privacy in the network layer. VPN allows only authorized users to access a particular network. VPN furthermore helps in accessing a remote network from a local machine thus increasing the accessibility of a network.
3. MAC layer: Management of the SSID names can help configure dynamic networks with multiple members. The MAC layer supports secure authentication and link encryption by exchanging keys upon association. For infrastructure mode, the device requests association using a given SSID, the access point allows association if the SSID matches its own SSID, then can proceed to authentication, where passwords and encryption keys are exchanged and checked. Security at the MAC layer thus provides data encryption to guarantee data integrity from sender to receiver and relies on:
   Wired Equivalent Privacy (WEP) is an encryption protocol that offers network security; or
   WiFi Protected Access (WPA and WPA 2) is the enhanced encryption protocol after WEP based on the IEEE 802.11i security standard. The first version uses public key encryption concepts. The second version uses the Advanced Encryption Standard (AES) identified by the 128-bit private key used. The AES is considered to be highly advanced and difficult to break.

The needs in data security vary from mission to mission and it is clear that the security precautions encoded within the WiFi standard do not suit all potential customers of space applications. It is likely that certain users will not be in favor of joining a HSN that is based on an open standard and ultimately the choice of the appropriate communications technology must match the security requirements of the network. In the case study presented herein, the network is made up of small spacecraft missions that are low-cost and for which security requirements are supposed to be low. It is contemplated that that the security provisions of the 802.11 standard are sufficient for a broad range of missions.

C. Network Management

Figure 2:
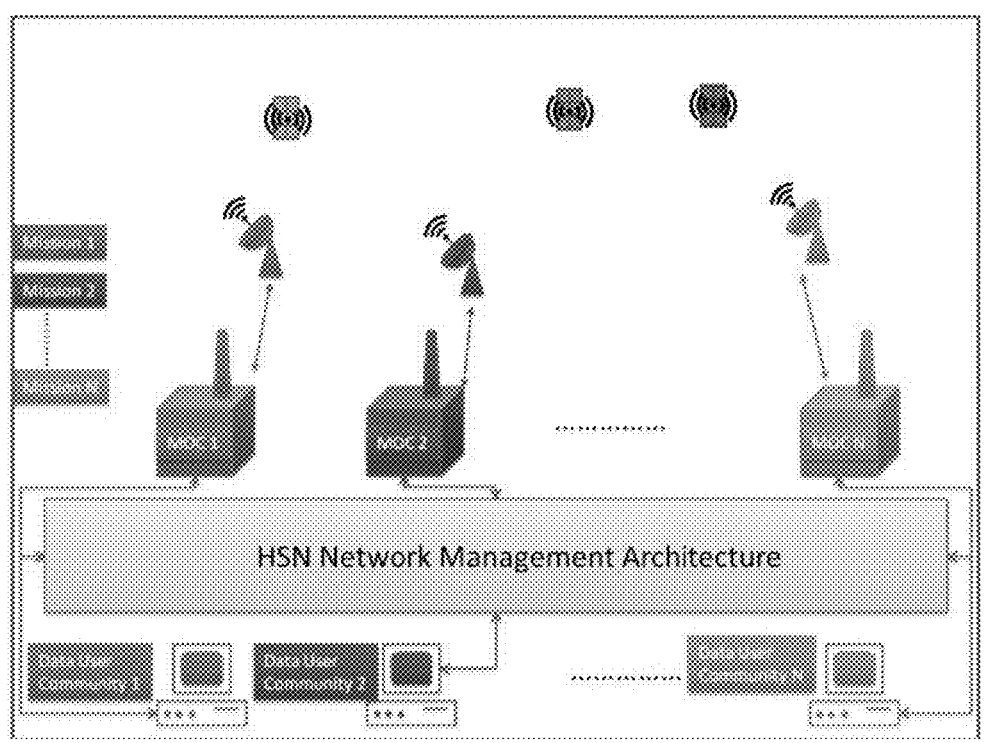
FIG. 2 shows HSNs consisting of N independent missions each of which is made up of 1 6 U cubesat, 1 ground station, 1 MOC and 1 data user community.

There is a need for centralized coordination between the nodes making up the HSN. This task is carried out by the HSN Network Management Architecture (NMA) as shown in FIG. 2. The purpose of the NMA is to act as a supplementary layer between the MOCs and the DUCs in order to facilitate the networking between the various missions. Following needs are to be covered:

1. Discovery, authentication, registration, and network separation—An overarching end-to-end architecture is needed to enable the establishment of the network and to facilitate the networking between nodes. Nodes need to be monitored and coordinated from network discovery until end of the connection.
2. Scheduling—A unique schedule of passes needs to be constructed for all the nodes involved in the network. One should ensure the obtained table of passes is fair and maximizes network efficiency. Each mission has to profit to the same extent from the added value of the HSN.

3. Coordination of activity planning—Based on the HSN schedule, there is a need for a consultative body that informs the MOCs on upcoming opportunities for communication. One should ensure all the necessary information on upcoming passes is delivered in a timely way to all the participants of the pass. The NMA should act as a facilitating body. The decision-making to use the pass must remain under the authority of the MOCs.

4. Minimizing operational costs—The NMA needs to ensure the HSN can be used in a seamless manner by all the MOCs involved. No additional resources in terms of manpower and infrastructure should be required from the MOCs.

5. Data management—The needs for data security and reliable delivery to the DUCs are to be met.

6. Monitoring and assistance for decision-making—The NMA should monitor the internal functioning of the HSN and report relevant statistics on the activity of each node. Monitoring should be both passive and active. If required, the NMA should provide information to facilitate the decision-making of the MOCs regarding upcoming communication opportunities. Monitoring network resources may be especially important when it comes to improving the performance of the HSN. Examples of spacecraft health status indicators to monitor include:

spacecraft power;

storage availability (for both mission data and housekeeping data);

transmitter characteristics and communication interface status (based on the position, mobility, direction of the spacecraft).

7. Optimizing connectivity and the use of network resources—As network bandwidth is likely to be scarce, the WiFi devices should run in the mode permitting the highest throughput efficiency. Furthermore, minimal control messages must be utilized to ensure that the spacecraft taking part in the HSN do not suffer from degraded performance. Configuration management (infrastructure vs ad-hoc mode) and fault management are key topics to be addressed.

Table 6 shows an overview of the most prominent challenges related to the NM of a HSN of small spacecraft in LEO.

TABLE 6

Challenges related to the network management of a HSN of small spacecraft for EO in LEO.

| HSN NM Specificities | Challenges |
| --- | --- |
| Small spacecraft in LEO | Short S-G communication times (between 5 and 15 minutes). Short S-S communication times (a few minutes). |
| Heterogeneous nodes | Different spacecraft and missions. NM needs to be flexible to take into account the specificities of all spacecraft and the internal agendas of all missions. |
| Limited bandwidth and resources | Requires optimum use of available bandwidth. Limited power and resources on a small satellite means that NM control messages need to be minimized. |
| High latency and PER links | Due to large communication range, large delays are incurred rendering control messages obsolete after a certain timeout. Unreliable communication channels only add to the complexity of the problem. |
| Orbital dynamics | Need to choose the right network topology (infrastructure mode vs ad- hoc mode) depending on the orbital configuration of the upcoming communication opportunities. |

TABLE 6-continued

Challenges related to the network management of a HSN of small spacecraft for EO in LEO.

| HSN NM Specificities | Challenges |
| --- | --- |
| Multi-institutional | Need to implement an adequate information and data security policy. |

There are a number of ways to accommodate the needs reported above without significant investment in physical infrastructure. For instance, a secure web application dedicated to the management of the HSN serves most if not all the needs. The HSN application would be accessible by each MOC through authentication using a unique HSN user name and password. The application would act as a monitor, coordinator and facilitator of the HSN. The network managers are located at a university and take charge of the maintenance of the application and the overall management of the HSN.

In this scenario, the MOCs would populate a HSN specific database with all the information required to make the network work. This is done on a voluntary basis and it is possible to retreat from the network at all times. The application computes the schedule for communication opportunities in a dynamical way, informs the MOCs about the opportunities, acts as a consultative and facilitating body between the MOCs and provides all the assistance required to make the HSN function, up to the delivery of the data to the end users.

D. Case Study: Ad-hoc Data Relay in LEO

To determine the impact of equipping cubesats with a WiFi transceiver, a simulation was performed to quantify the downlink throughput that can be achieved with the HSN. The commercially available Systems Toolkit (STK) software was used to compute the orbital dynamics of the different spacecraft. Then, that data was fed to the open source ns-3 network simulator to determine the performance of the network in terms of data throughput. The method is described in more detail farther below.

The simulation was made up of 63 Earth Observation missions. Each mission is made up of a 6 U cubesat, a ground station, a MOC and a DUC. The spacecraft are put on various orbits commonly used for EO missions. The chosen 63 orbits belong to spacecraft currently evolving in LEO. This way, a representative sample of the current population of EO spacecraft could be obtained thereby providing a certain statistical significance to the result. Note that no fine-tuning has been performed to optimize the orbits in order to maximize data throughput.

TABLE 7

Figure 4:
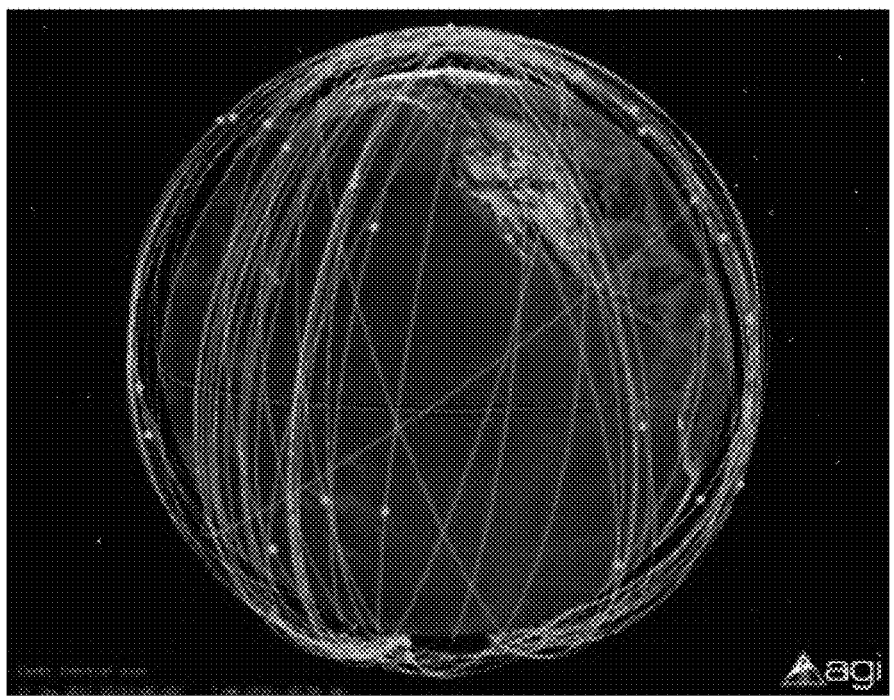
FIG. 4 illustrates a simulation of a HSN Earth Observation platform in LEO made up of small spacecraft, where the simulation is made up of 63 6 U cubesats and the chosen orbits are those of existing EO spacecraft in LEO.

Description of the 3 runs performed to quantify the performance of the secondary HSN shown in FIG. 4.

| Run # | Short Name | Description |
| --- | --- | --- |
| 1 | No HSN | There are no S-S links and the S-G links are performed in the conventional way using the WiFi transceiver. |
| 2 | Partial HSN | The HSN is used for S-S links only. S-G links are performed in the conventional way (i.e., to the mission internal ground station). |
| 3 | Full HSN | Full HSN using both the S-S and S-G link capabilities. |

FIG. 4 shows a picture of the initial setup. The image shows the 63 cubesats on their respective orbit prior to running the simulation. The downlink throughput is then calculated for three different runs, labeled 'No HSN', 'Partial HSN' and 'Full HSN', and described in more detail in Table 7. The three scenarios are run for 1 day using the initial parameters of Table 8. The results are shown in Table 9.

TABLE 8

Main parameters used for the simulation shown in FIG. 4.

| Parameter | Value |
|---|---|
| WiFi transceiver constant bit rate (CBR) | 128 kbps |
| Average # of passes per ground station (/day) | 4-6 |
| Average duration of a pass | 12 mins |

TABLE 9

Downlink volume per day obtained for the simulation shown in FIG. 4.

| Run | Downlink volume (GB/day) |
|---|---|
| No HSN | 3.45 |
| Partial HSN | 4.28 |
| Full HSN | 34.88 |

The total downlink throughput obtained in run #1 is 3.45 GB/day. This result confirms our baseline assumption that a WiFi transceiver can effectively be used as a communication device between a ground station and a spacecraft in LEO. Per spacecraft the throughput is equivalent to about 55 MB/day and to about 12.16 MB/pass. Considering that the downlink rate used is 128 kbps, the expected theoretical throughput per pass is 128/8/1000*12*60=11.52 MB. This theoretical value is in good agreement with the result obtained in the simulation.

Run #2 shows that only moderate improvement is obtained when including the S-S link capability of the HSN. A downlink volume of 4.28 GB is obtained, i.e. 0.83 GB more than in the case where each mission operates without S-S links. This result is a direct consequence of the fact that the simulation has been performed without optimizing the orbits of the spacecraft with respect to each other in order to maximize throughput.

For run #3 a downlink volume of 34.88 GB is obtained. This is an order of magnitude more than in run #1 where no HSN has been used. When using the S-G capability of the HSN, the amount of data transferred to Earth rises from 55 MB to 0.5 GB per day for each cubesat. Note that the increase is mainly due to the ability of the network to use the ground stations of all the missions involved. The throughput would have been even higher if the orbits of the different nodes had been fine-tuned with respect to each other. It is also worth mentioning that only one ground station per mission has been used in the current simulation. The concept of the presented HSN is built around the utilization of low-cost university-class ground stations. It is therefore not impossible to envision a ConOps including more than 63 ground stations.

In summary, the result obtained is rather encouraging. HSNs may be an interesting option to enhance the throughput capability of next-generation small spacecraft EO platforms. In a simple simulation set up without any optimization of orbits we have provided evidence that a WiFi transceiver can effectively be used as S-G communication hardware and that a significant increase in data volume can be achieved if the advantages of a networked environment in space are harnessed.

Clearly, throughput volumes larger than the ones shown in Table 9 can be achieved if one equips the cubesats with advanced S-band, C-band or other high performance transceivers. However, the use of these devices has shown to have inconveniences as well, especially in relation with the SWaP limitations of current small spacecraft platforms. In addition to this, they are not the most cost-effective solution when it comes to maximizing downlink throughput.

Each institution that provided a node to the network in our simulation increased its throughput of mission data by an order of magnitude for virtually no additional cost.

Cost effectiveness is certainly the main advantage of using an HSN. Depending on the purpose of the network, the upfront costs associated to the setting up of the required NMA range from low to moderate. As mentioned earlier, for low-profile HSNs a NMA developed and operated by students in a university laboratory is probably sufficient. For more advanced HSNs, the cost of the required management architecture is still expected to be relatively low compared to the potential benefits of the network. Once the NMA is set up, recurring costs during mission operations are limited if not negligible. It remains up to each MOC to decide to what extent to take advantage of the network. Each MOC has the possibility to adapt network usage according to existing internal resources and budgetary constraints.

Another aspect likely to impact the cost-effectiveness of the network in a positive way is the possibility to join the network at all times. Institutions initially not interested in joining the project may change their position at a later time and provide additional capability. Mission lifetime, today a limiting factor for space missions, would also benefit from a design that is heterogeneous in nature. The cloud of spacecraft in orbit can be refurbished at all times with new units originating from those institutions with the highest vested interest in extending the lifetime of the network.

The simulation carried out herein is the first in a series of simulations to investigate the true cost-effectiveness of HSNs. In this first simulation, no effort has been put into optimizing the quality of the data that can be collected using the network. From a mission designers' perspective there is room for improvement, especially with regards to the distribution of the network nodes around the globe. The frequency of revisit times over particular spots of interest can be increased. Likewise, one may take advantage of the ability of the network to collect a vast amount of correlated measurements from different locations around the globe. Cost-effectiveness has only been investigated from the aspect of downlink volume and not with regard to the intrinsic scientific merit of the network.

E. Conclusion and Application

Heterogeneous Spacecraft Networks (HSNs) are an improvement for multi-institutional and multi-national networking between spacecraft of different origins. The main advantage of HSNs is cost-effectiveness achieved through broader participation. The required funding is reduced compared to the case where a single institution ventures to build, launch and operate a network of spacecraft on its own. In the case where funding is widely available across institutions, the value of the network can be increased by launching a larger number of nodes. The paradigm of HSNs is not limited to the use of small spacecraft only, nor is the utilization of such networks limited to LEO. A grander vision should encompass spacecraft of all sizes and origin to construct a networking environment in orbit much similar to the one established on Earth through the advent of the Internet. Heading towards internet-working between spacecraft through the incremental development of new technological solutions will almost certainly increase the effectiveness of operations in space. It should be noted that the present invention is not limited to the use of any given standard, such as 802.11. Other publicly available solutions such as ZigBee, or modifications thereof, may very well be the preferred option in the long run. The optimal communications solutions may change from application to application. Beyond LEO, Delay Tolerant Networking (DTN) capabilities may be needed.

II. Performance Analysis for Low-Cost Earth Observation Missions

Heterogeneous Spacecraft Networks (HSNs) are network environments in which spacecraft from different missions and institutions can communicate with each other at low cost and with low impact on overall system resources. The Mission Design Center (MDC) at NASA Ames Research Center has been studying solutions for low cost multi-spacecraft systems for a number of years. One may now build on the idea to interconnect clusters of spacecraft with each other to have them act as mobile nodes belonging to the same collaborative mission. Recent progress in small satellite technology is significant, and one of the advantages of small satellites lies precisely in the large quantity of spacecraft that can be produced at accessible costs. It follows naturally that small satellites are an interesting candidate platform for development and demonstration of the HSN concept. The general concept of operations for HSNs in LEO and a number of future applications are described above, while enabling technology such as devices and lower layer protocols are discussed farther below.

The following description is the scenario of a low-cost and multi-institutional network of Earth Observation (EO) missions in LEO and conduct network performance analysis using the AGI System Tool Kit (STK) and the open-source Network Simulator (NS-3). A multi-spacecraft network consolidates the individual capabilities of each spacecraft from different institutions by combining benefits of both frequent revisit and concentrated observation. Complementary and correlated data could be collected simultaneously from a large set of distributed spacecraft utilizing HSN capability. In this specific configuration, communication distance between spacecraft, related delays and error rate are the major factors in network performance. Also, average duration of communication opportunities between spacecraft is usually very limited. Thus, it is important to simulate orbital dynamics, link margins, and protocols simultaneously to analyze network performances. Below, existing protocols are compared to obtain a measure for the practical performance of the candidate network. The focus is on best-effort data delivery, an approach necessitated by the severe constraints on communications resulting from low-cost and low system resource small spacecraft. In the application layer, it is shown that packet size and data rate of a source node also affect overall performance of the network.

From the early days of space age, ideas of inter-satellite link to build a network in space have been proposed and discussed over and over again. Some of these were implemented as real projects, and some were not. However, most of these actual missions were designed and developed for a specific objective such as commercial communication services and military use. Today's network is an infrastructure for various kinds of different services. Especially the Internet is a backbone of almost all of communications.

This kind of infrastructure has not already been developed in space primarily because of cost. Due to the long range and high reliability requirements of space communication, space-specific protocols and transceivers were developed and used in past missions. These space specific features drove space missions to be higher-cost. What is described herein is to build a low-cost network in space, which utilizes ground-based open standard technologies. Anyone and any institutions can join these space networks called Heterogeneous Spacecraft Networks (HSNs). This is a very straightforward approach, and is a counterpoint to the complex growth of ground network infrastructure. The IEEE 802.11 Wi-Fi standard is used as a basis of HSNs. Actually, using Wi-Fi is not as efficient and reliable compared with using space-specific protocols and devices. However, Wi-Fi devices are very low cost in commercial markets, and they have thus small impact on project budget. Maintaining low cost is crucial to engaging the small satellite community and building a worldwide space network.

It is shown how long-range Wi-Fi is feasible for space-to-space links of hundreds of kilometers and even for space-to-ground links of thousands of kilometers, and what the limitations are. In the past, researchers have revealed that parameters in the Wi-Fi media access control (MAC) layer must be modified to enable long-range Wi-Fi. In those studies, their envisioned communication range was a few tens of kilometers. Some researchers have studied using Wi-Fi for inter-satellite link with 2000 km range, however the cross relationship between bit error rate in the physical (PHY) layer and packet size in the application layer was not considered because they used Network Simulator-2 (NS-2), which does not support wireless communication natively, in the simulation. The present invention uses NS-3, the newer version of open-source network simulator, which was developed for wireless communications. Other researchers have implemented hardware-in-the-loop network simulator for their cubesat project using Wi-Fi. However their maximum communication range was 15 km. It is believed no one has so far used Wi-Fi for space-to-ground link. In addition, a special technique is used to solve antenna pattern modeling problems for space-to-ground link in NS-3.

A. Architecture of HSNs

The Mission Design Center (MDC) at NASA Ames Research Center has studied solutions for low cost multi-spacecraft systems for a number of years. An example of this is the Edison Demonstration of Smallsat Networks (EDSN) mission. The goal of EDSN is to demonstrate a swarm of small, inexpensive satellites with novel in-orbit communications capabilities and their suitability to act as a future platform for distributed space weather measurements.

Figure 5:
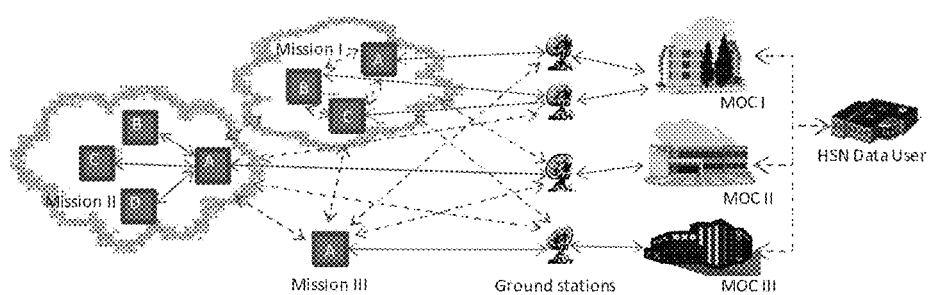
FIG. 5 is a diagram where red dashed arrows show inter-mission link functionality augmented by the HSN.

As the next step, MDC investigated if spacecraft that are procured, built, launched and operated by different multi-institutional players can be integrated into a single network for various mission objectives. The idea is to have each institution procure one or several spacecraft in the conventional way but with the hardware necessary to become an ad-hoc member of a large in-orbit cloud of multi-institutional spacecraft. Each spacecraft may be different in design and may or may not have a dedicated primary mission. However, all of them have the possibility to join and leave the cloud whenever desired and work towards a common objective with the other spacecraft defining the network. This common objective can be aligned with the primary missions of all or some of the nodes or none at all. As such, one may speak of a network of spacecraft that is truly heterogeneous in nature since both the origin of the nodes making up the network and the primary mission for which they are flying may be significantly different (FIG. 5).

To make maximum use of the capability of such HSNs, the number of nodes in space has to be relatively large. Recent progress in small satellite technology is significant, and one of the advantages of small satellites lies precisely in the large quantity of spacecraft that can be produced at accessible costs. It follows naturally that small satellites are an interesting candidate platform for development and demonstration of the HSN concept.

Network elements in a HSN are divided largely into two segments; space segment and ground segment.

Space segment: In terms of configuration and mission characteristics, spacecraft (S/C) in a network are classified in different ways: 1) "Standalone" which is a single S/C mission, 2) "Constellation" which usually consists of several S/C arranged in one or more orbit planes with constant orbit phase separation, 3) "Formation flight" which usually consists of two or more S/C precisely arranged to keep constant distance within communication range, and 4) "Swarm" which usually consists of several nano- or pico-satellites arranged like cloud in congested formation without orbit control. Taking these into consideration, two different types of S/C nodes to conduct network performance analysis are defined. The first one is called a "Gateway S/C" which has a data source inside and also serves as a data relay between S/C or ground stations (G/Ss). The second is called a "Probe S/C" which also has a data source inside but can only send data to gateway S/C and not to the G/Ss. In the following sections, gateway S/C are larger in size, e.g. micro- or mini-satellites, and probe S/C are smaller in size, e.g. nano- and pico-satellites.

Ground segment: Ground segment consists of G/Ss, Mission Operation Centers (MOCs), and data users. Usually, a single mission has several G/Ss and one MOC to operate their S/C. In some missions, MOCs and Science Operation Centers (SOCs) are separately arranged, where MOCs operate S/C bus system and collect housekeeping data, and whereas SOCs support collecting science mission data. However, to make a discussion simple for the network performance analysis, SOCs are assumed to be unified with MOCs.

The IEEE 802 family of standards can be adapted to meet the wireless communication needs in HSN compatible missions. The Wi-Fi 802.11 standard was selected for HSNs due to component availability and cost. In order to enable long range communication, MAC layer parameters must be modified, and currently, open-source MAC software appears to be only available for Wi-Fi.

As two types of S/C, probes and gateways are defined, there are also two types of inter-spacecraft links (ISLs). The first is a link between two gateway S/C (hereafter S-S). The second is a link between a probe S/C and a gateway S/C (hereafter P-S). Wi-Fi ad-hoc mode is used for these ISLs in a HSN mission. For links between gateway S/C and G/Ss (hereafter S-G), Wi-Fi is an option. For a S/C that has faster communication devices like a X-band transmitter, it is better not to use Wi-Fi for S-G link. However, applying Wi-Fi to an S-G link has a great potential capability to open the future of a worldwide low-cost heterogeneous S-G network.

In the past conventional space missions, the Consultative Committee for Space Data Systems (CCSDS) standards or dedicated point-to-point protocols were used in the S-G link and ISL. In contrast, HSNs utilize Internet protocol suite for upper communication layer protocols. This also expands the capability of HSNs by connecting space networks to the ground Internet with the same protocol. Table 10 shows a comparison between conventional spacecraft links and envisaged HSN links.

TABLE 10

Comparison between conventional spacecraft links and envisaged HSN links.

| Link | Conventional | HSN |
| --- | --- | --- |
| ISL (S-S, P-S) | None or S-band + CCSDS or point-to-point protocol | Wi-Fi Ad-hoc + Internet protocol suite |
| S-G | S- or X-band + CCSDS | Wi-Fi Ad-hoc + Internet protocol suite |
| G/S-MOC | Point-to-point + various protocol | Point-to-point + Internet protocol suite |
| MOC-MOC | None | Internet + Internet protocol suite |

In terms of performance of the network, the large latency that is inherent to long range space communication is the biggest challenge. Since Wi-Fi is not designed for long range applications, some part of the protocols must be modified. In order to obtain higher throughput, even up to the application layer software must be optimized. Other challenges, which are addressed throughout the present application, include:

Multi-institutional related issues like operation policy and security policy,

Network management,

Hardware, chipsets for space Wi-Fi and

Regulations.

B. Analytical Design in Each Communication Layer

Table 11 shows the communication layers used in our simulations compared with the Open Systems Interconnection (OSI) model. The following includes a description from the PHY layer to the application layer to design HSN inter-spacecraft links and S-G links, revealing the effect of large latency on long range communication using Wi-Fi.

TABLE 11

Communication layers.

| OSI model | Simulation model |
| --- | --- |
| 7. Application | Application |
| 6. Presentation | |
| 5. Session | |
| 4. Transport | TCP/UDP |
| 3. Network | IP |
| 2. Data link | MAC |
| 1. Physical | PHY |

The performance of the PHY layer defines the maximum communication range among nodes. A typical Wi-Fi communication range is 35 m indoors and 100 m outdoors. In order to enable long range Wi-Fi communication, signal must be amplified by higher transmitting (TX) power and/or higher antenna gains. However, at the same time, because Wi-Fi 802.11 standard is using industrial, scientific and medical (ISM) radio bands that are unlicensed and opened to public use, the PHY layer of HSNs is designed so as not to affect ground-based Wi-Fi systems.

Figure 6:
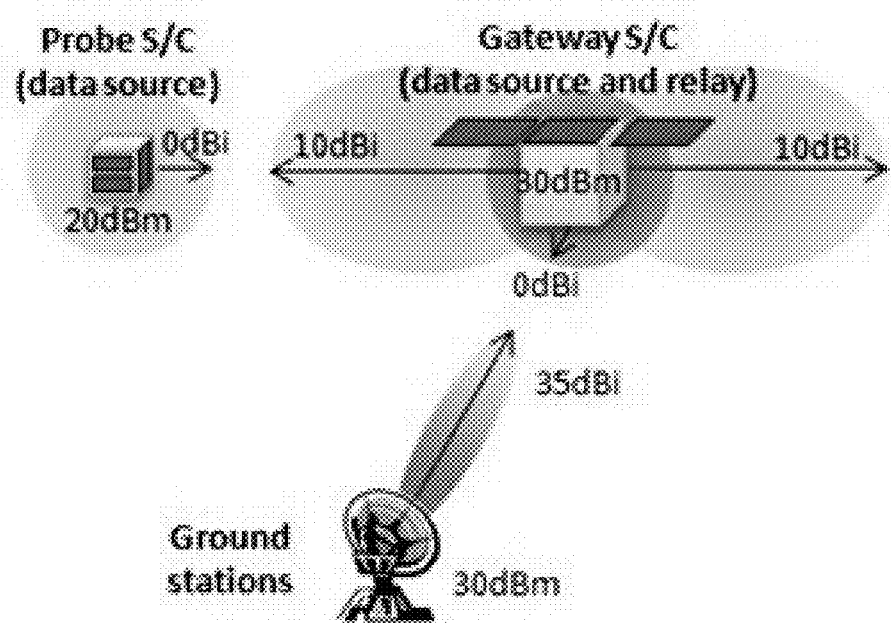
FIG. 6 illustrates transmitting power and antenna pattern assumptions.

In present Commercial Off-The-Shelf (COTS) hardware technology, Wi-Fi transmitters can handle up to a TX power of 1 W (=30 dBm). For probe S/C nodes which are pico- and nano-satellites, their Size, Weight and Power (SWaP) is strictly limited. Thus, it is contemplated that that their maximum TX power is 20 dBm, and the antenna is omnidirectional with 0 dBi antenna gain. For gateway S/C, it is contemplated that they have a 10 dBi directional antenna for S-S ISL. G/Ss usually have a sharp antenna pattern with larger antenna gain. Here, 35 dBi for antenna gain is used. FIG. 6 summarizes TX power and antenna gain assumptions used in the PHY model. Note that this assumption is just one example that enables HSNs. ISL may be established by using a higher power transmitter or precise target pointing attitude control with higher gain antenna.

Received signal power is calculated from Friis propagation model using the following equation;

$$\text{Signal power} = \frac{P_{TX} \times G_{TX} \times G_{RX}}{NF} \left(\frac{\lambda}{4\pi R}\right)^2 \quad (1)$$

where $P_{TX}$ is the transmitting power of a transmitter, $G_{TX}$ is the antenna gain of a transmitting node, $G_{RX}$ is the antenna gain of a receiving node, NF is the noise figure of a receiver, which is here 1 assumed as an ideal value, $\lambda$ is the wavelength, which is 0.125 m for the 2.4 GHz Wi-Fi ISM frequency, and R is the range between nodes. Noise power without interference can be obtained based on basic physics, as follows:

$$\text{Noise power}=290 \times \kappa \times \text{bandwidth} \quad (2)$$

where 290 is the system noise temperature in K, $\kappa$ is the Boltzmann constant, which is $1.380\,6488 \times 10^{-23}$ J/K, and the bandwidth of Wi-Fi 802.11b standard is 22 MHz. Then, signal-to-noise ratio (SNR) and the energy per bit to noise power spectral density ratio ($E_b/N_0$) are defined in the following equations;

$$\text{SNR}=\text{Signal power/Noise power} \quad (3)$$

$$E_b/N_0 = \text{SNR} \times \text{bandwidth/SPS} \quad (4)$$

where SPS is symbols per second. In order to obtain the highest $E_b/N_0$, SPS must be minimized. Direct Sequence Spread Spectrum (DSSS) 1 Mbps mode in 802.11b was selected, and its SPS is 1 Mbps. Although 1 Mbps is the lowest speed defined in 802.11, it is fast enough for most space applications. Note that in the real world, there is surely some sort of interference, therefore this SNR is the ideal value. Bit Error Rate (BER) can be calculated for differential phase-shift keying (DBPSK) modulation used in 802.11b DSSS 1 Mbps mode with the following equation;

$$\text{BER}_{DBPSK} = 0.5 \times \exp(-E_b/N_0). \quad (5)$$

Finally, Packet Success Rate (PSR) can be obtained as follows;

$$\text{PSR} = (1-\text{BER})^{BPP} \quad (6)$$

where BPP is bits per packet. To obtain higher PSR, BPP must be minimized. As shown in the latter half of this section, smaller BPP increases the number of packets to send, and that disturbs efficient use of time slot allocation. Here, BPP=16512 bits/packet (2064 bytes/packet) is applied. In order not to fragment packets smaller than 2064 bytes in upper layer protocol, the value of the fragmentation threshold in each layer must be modified respectively.

From equations (1) to (6), maximum communication range at required PSR ($\text{PSR}_{req}$) can be given as:

$$\text{Max range} = \frac{\lambda}{4\pi} \sqrt{-\frac{P_{TX} \times G_{TX} \times G_{RX}}{290 \times \kappa \times SPS \times \log(2 \times (1-\text{PSR}_{req}^{1/BPP}))}}. \quad (7)$$

Figure 7:
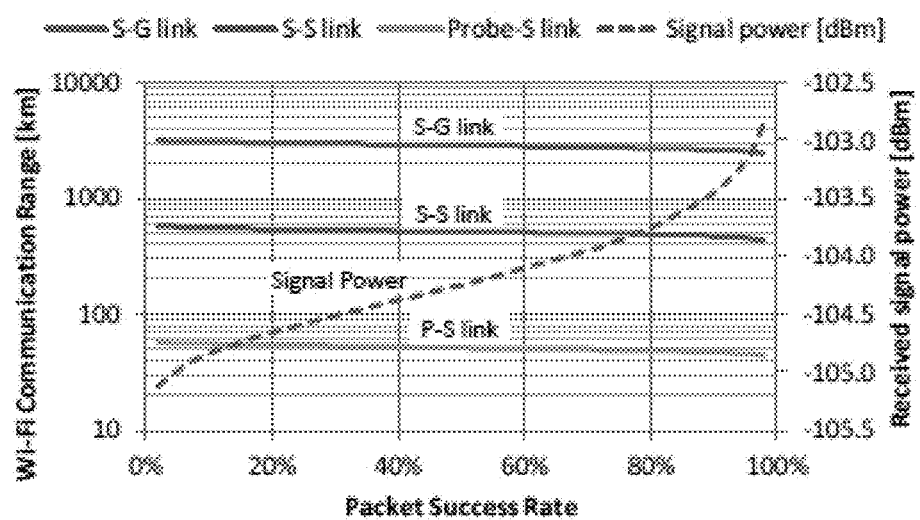
FIG. 7 shows packet success rate vs. maximum communication range of Wi-Fi in space and received signal power.

FIG. 7 shows the result of calculation of packet success rate vs. maximum communication range and received signal power. As shown in the figure, received signal power is bigger than −105 dBm at PSR greater than 10%. The maximum communication range for P-S link is around 55 km, for S-S link it is around 550 km, and for S-G link it is around 3100 km. For P-S and S-S links, these ranges are a limitation to a mission. On the other hand, considering that the maximum slant range from orbit of 720 km altitude to a ground station is 3113 km, the range estimate for S-G link is appropriate for LEO spacecraft.

Figure 8:
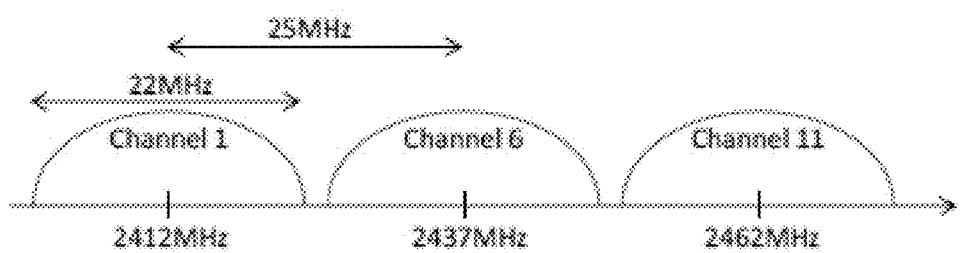
FIG. 8 illustrates applying different channels to ISL and S-G links.

To increase communication range without increasing TX power and antenna gains, error correction code could be added to secure coding gain. However, this requires bigger changes to the Wi-Fi standard, and therefore this approach wasn't applied. In order to avoid interference between an S-G RF signal and an ISL (S-S and P-S) RF signal, different channels can be allocated to each link since Wi-Fi DSSS mode has three non-overlapping channels within its ISM frequency band as shown in FIG. 8.

Figure 9:
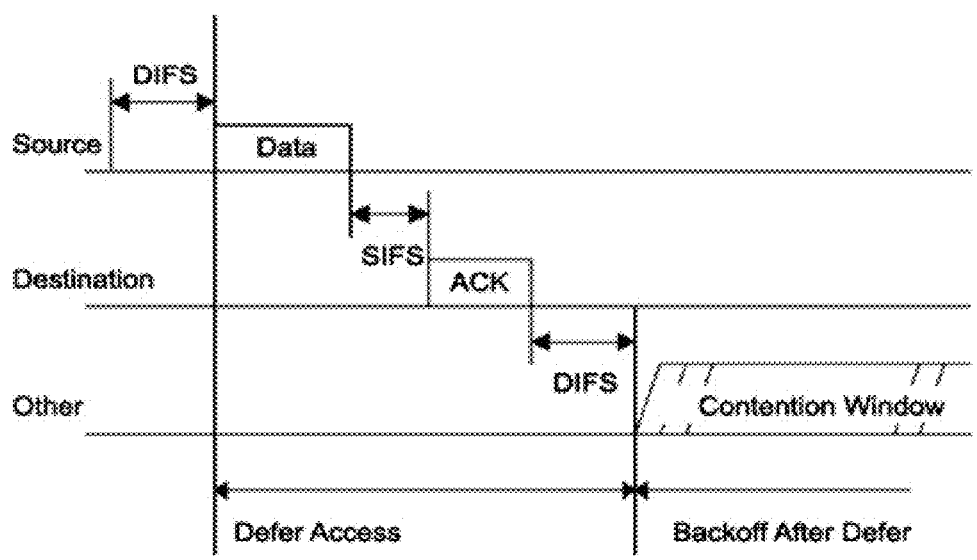
FIG. 9 is a graph showing data and ACK procedure and related interframe space for Wi-Fi MAC layer.

As discussed in past studies, in order to enable long range Wi-Fi, MAC layer parameters must be modified. The fundamental access method of the IEEE 802.11 MAC is a distributed coordination function (DCF) known as Carrier Sense Multiple Access with Collision Avoidance (CSMA/CA). FIG. 9 illustrates the Data and ACK procedure used in the Wi-Fi MAC layer.

In order to control medium access, six different interframe spaces (IFSs) are defined. Only the most important parameter, DCF IFS (DIFS), is discussed here. After DIFS time, there is also random backoff time shown as the "contention window" in the figure. The backoff time is an integral multiple of Slot Time defined as;

$$\text{Slot Time}=9\mu\text{sec}+\text{APT} \quad (8)$$

where APT is Air Propagation Time. In long range Wi-Fi, this APT limits the overall performance. Then, DIFS Time is obtained as;

$$\text{DIFS Time}=\text{SIFS Time}+2 \times \text{Slot Time}. \quad (9)$$

where Short IFS (SIFS) Time is 10 μsec constant value. Table 12 summarizes modified parameters used in Wi-Fi MAC DCF.

TABLE 12

Parameters used in Wi-Fi MAC DCF.

| Items | S-G | S-S | P-S |
|---|---|---|---|
| Maximum range | 3100 km | 550 km | 55 km |
| Air Propagation Time | 10.33 msec | 1.83 msec | 0.18 msec |
| Slot Time | 10.34 msec | 1.84 msec | 0.19 msec |
| SIFS Time | 0.01 msec | 0.01 msec | 0.01 msec |
| DIFS Time | 20.69 msec | 3.69 msec | 0.39 msec |

To avoid collision and the hidden node problems, a Request To Send/Clear To Send (RTS/CTS) procedure is usually added prior to the actual data frame. However, since the S-G link is connected by G/Ss with sharp antenna patterns, no other node will interfere with the link unless intended. Thus, the hidden node problem in the S-G link is not of concern, and RTS/CTS messages can be omitted to save time occupied by this procedure. On the other hand, S-S links may experience collision due to the positional relationship among spacecraft and may raise a hidden node problem. Thus, timing coordination using RTS/CTS procedure is necessary.

The network layer is responsible for determining paths to the destination, i.e. addressing the nodes, routing, and also handling mobility-based topology changes in the network. There are mainly two types of routing methods: Reactive and proactive. In reactive methods, a new route to the destination is computed only when required while in a proactive routing method, routes are available immediately when needed as they are computed in advance. Table 13 shows pros and cons of IP routing protocols; Optimized Link State Routing (OLSR) for proactive routing, Ad hoc On-Demand Distance Vector (AODV) protocol for semireactive routing, and Dynamic Source Routing (DSR) protocol for reactive routing. Since the network topology is known a-priori, OLSR was chosen as the routing protocol as it has minimal control overhead and the routes can be pre-computed. The periodic control messages can be sent less frequently to accommodate for the lack of bandwidth available in a space network.

TABLE 13

Pros and cons of routing protocol.

|  | Pros | Cons | Applicable scenarios |
| --- | --- | --- | --- |
| OLSR | Decentralized algorithm; Routes available immediately; less control overhead | Periodic control messages; Increased bandwidth usage | Where topology information is available beforehand |
| AODV | No periodic control messages; Adaptive to sudden unpredictable changes in topology | High control overhead; Mobile nodes need to store routing | In highly mobile and rapid changing network topologies |
| DSR | Less overhead in the Network layer as path is available in the header of route request packet; Minimized control messages as fewer broadcast messages sent | Less adaptive to highly mobile environments | In relatively less mobile and static topologies |

The IP layer has a provision for managing demands from different types of applications. In an actual mission, there are two types of telemetry data; housekeeping (HK) data and mission (MS) data. HK data usually indicates the health status of a spacecraft bus system and is monitored by the operator in real-time at its MOC. MS data is usually scientific data and its data size can be huge. Usually it doesn't have to be downloaded in real-time, but requires integrity. To show the basic performance of a HSN with a simpler model, these two types of data are not distinguished in the following simulations. In order to not compromise on the throughput of mission-related data, as a part of future work, QoS based information transmission is provided. Using the Differentiated Services (DiffServ) available in layer 3, the maximum throughput service for MS data and minimize delay service for HK data is used. (FIG. 6). This ensures real-time delivery of HK data.

Figure 10:
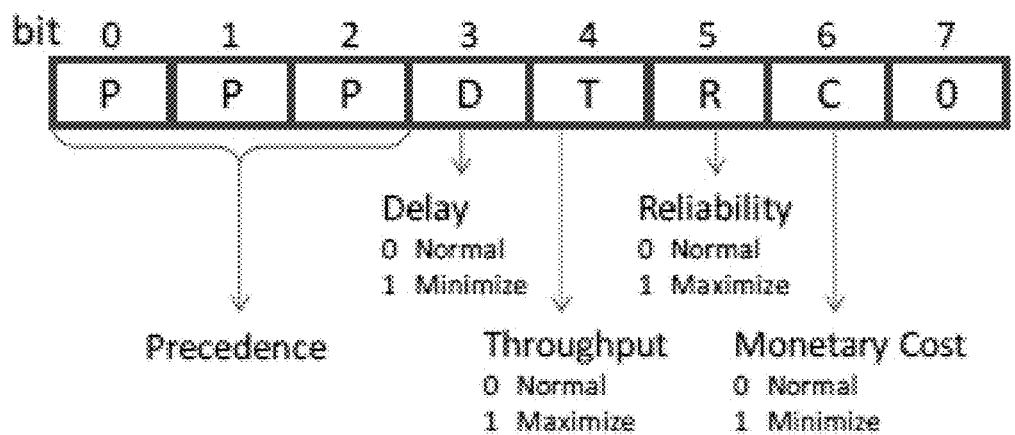
FIG. 10 illustrates DiffSery parameters in IP header.

FIG. 10 illustrates DiffServ parameters in IP header.

Table 14 shows comparison of TCP with UDP. Although TCP is reliable, it incurs a large delay as compared to UDP. In this scenario, the long propagation delay will cause additional undesirable delay lowering the data rate of the application. Thus, in experiments, UDP as the transport protocol for both MS data and HK data was chosen. However, in order to provide resilience to losses, TCP for MS data and UDP for HK data may be used.

TABLE 14

Comparison of TCP with UDP.

| Features | TCP | UDP | Remarks |
| --- | --- | --- | --- |
| Communication Reliability | Connection-oriented approach Highly reliable as it provides error-correction | Connection-less approach Less reliable; No error-correction capabilities | TCP models wired-networks End-to-end reliability is achieved with TCP |
| Delay | Increased latency in data delivery | Faster data delivery with less control overhead | Real-time applications prefer UDP as transport |
| Data sequences | Important that packets received are in order, else a packet loss is inferred | No importance to packet order as it is based on a fire and forget approach | Streaming applications benefit from the requirement of data ordering in TCP |

In the application layer, the packet size of data sent is defined by source applications. A source application installed on each S/C node generates constant bit rate (CBR) traffic to a sink node. A sink application is installed on a MOC node of each mission. Note that there are other types of traffic besides HK and MS data, such as network management packets and command packets sent by ground operators.

A mission data transmission time with RTS/CTS control procedure can be calculated with the following equation:

$$(RTS/CTS+Data/ACK)Time=DIFS\ Time+RTS\ bits/PhyRate+APT+SIFS\ Time+CTS\ bits/PhyRate+APT+DIFS\ Time+Data\ bits/PhyRate+APT+SIFS\ Time+ACK\ bits/PhyRate+APT \quad (10)$$

where PhyRate is 1 Mbps in this case. Considering that DIFS time is almost twice that of APT from equation (8) and (9), the total transmission time contains eight APTs, and these APTs occupy most of the time in transmitting data. Thus, air propagation time is apparently the constraining condition to Wi-Fi throughput performance. In order to minimize the effect of this big latency, the number of packets must be reduced by applying bigger packet size. On the other hand, too large packets will decrease packet success rate as shown in equation (6). Here, in simulations, 2000 bytes/packet (16 kbits/packet) for the packet size at the application layer is used, which is 2064 bytes/packet (16512 bits/packet) at the MAC layer. As shown in Table 15, single packet data without RTS/CTS procedure occupies 58.00 msec for S-G link. This means 275.9 kbps (16 kbits/packet× 17.24 packets/sec) is the maximum throughput. In the same way, single packet data with RTS/CTS procedure occupies 31.64 msec for S-S link and 18.44 msec for P-S link. So, the maximum throughput is 505.7 kbps (16 kbits/packet×31.61 packets/sec) for S-S link and 867.7 kbps (16 kbits/packet× 54.23 packets/sec) for P-S link respectively.

TABLE 15

Time occupied by round trip messages and derived maximum throughput.

| Items |  | S-G | S-S | P-S |
| --- | --- | --- | --- | --- |
| Maximum range |  | 3100 km | 550 km | 55 km |
| Occupied | Data/ACK | 58.00 msec | 24.00 msec | 17.40 msec |

TABLE 15-continued

Time occupied by round trip messages
and derived maximum throughput.

| Items | | S-G | S-S | P-S |
|---|---|---|---|---|
| Time | (2-way) RTS/CTS + Data/ACK (4-way) | 99.64 msec | 31.64 msec | 18.44 msec |
| Maximum throughput | | 275.9 kbps | 505.7 kbps | 867.7 kbps |

Figure 11:
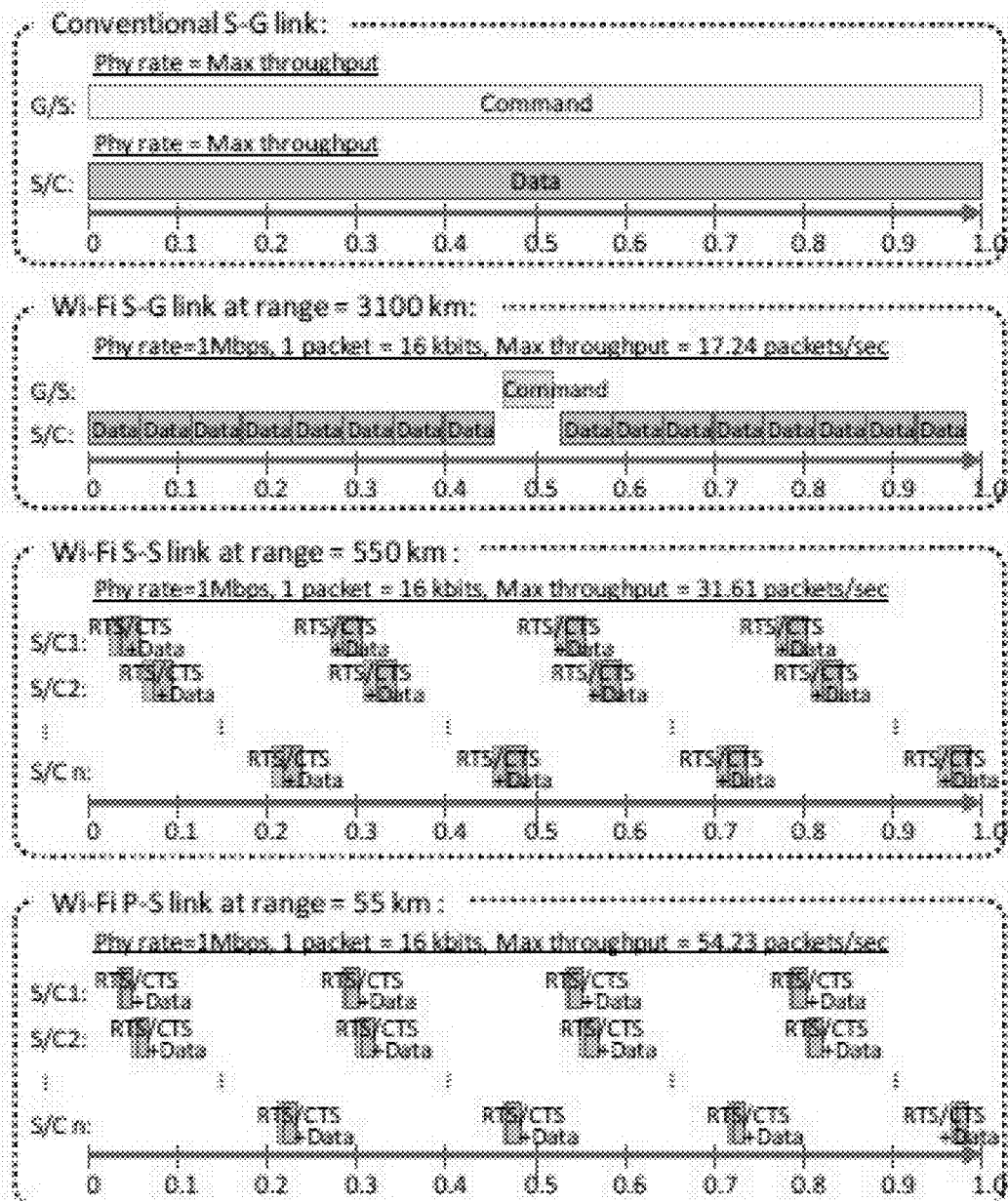
FIG. 11 shows an example of time slot allocation for conventional S-G, Wi-Fi S-G, and Wi-Fi S-S link.

FIG. 11 shows an example of time slot allocation within one second for conventional S-G, Wi-Fi S-G, and Wi-Fi S-S link. Each box in the Wi-Fi link indicates a 2-way (message+ACK) timeslot. In the conventional S-G link, time is fully occupied by command or telemetry data with lower Phy-Rate. In the Wi-Fi link, although PhyRate is higher than conventional S-G link, time must be shared with a number of messages. For example in the Wi-Fi S-G link, considering time slot allocation for uplink commands, lower layer messages and other management packets, actual maximum downlink throughput will decrease. In the Wi-Fi S-S and P-S links, a number of S/C share the same time frame. Thus, maximum throughputs must be divided by the number of S/C within communication range to obtain actual effective maximum throughputs per a single S/C.

C. Simulation Model and Method

To show the performance of proposed HSNs, an envisaged example EO mission using a HSN is proposed here. The mission is an EO virtual platform comprised from three different types of missions: a swarm, a constellation, and a standalone spacecraft. While each mission is procured, built, launched and operated by a different institution, the HSN will augment the capability with higher throughputs, and simultaneous complementary and correlated data collection from a large set of distributed spacecraft, and gives an additional value to the original missions.

One example of such scientific usage is earthquake precursor event monitoring. Plenty of signs that seem to be related to earthquakes were reported in past large disasters, but hypothetical earthquake precursor events are not yet proven to be useful to forecast earthquakes. Because the concept is as yet theoretical, and also because of the cost to investigate at the required scale, monitoring these signals from space has not been done systematically. One researcher has shown from a solid state physics perspective that when rocks are stressed prior to large earthquakes, the Earth sends out transient signals. These signals may consist of local magnetic field variations, electromagnetic emissions over a wide range of frequencies, a variety of atmospheric and ionospheric phenomena. To prove and make use of this theory to understand actual pre-earthquake events, many different types of observed data must be correlated and analyzed statistically. In the past, there were a few satellite missions whose data is considered beneficial for earthquake precursor event study. However, none of these data were correlated with each other. Using the capability of a HSN, these data can be correlated in space, and complementary data simultaneously and intensively with increased throughput can be collected.

Figure 12:
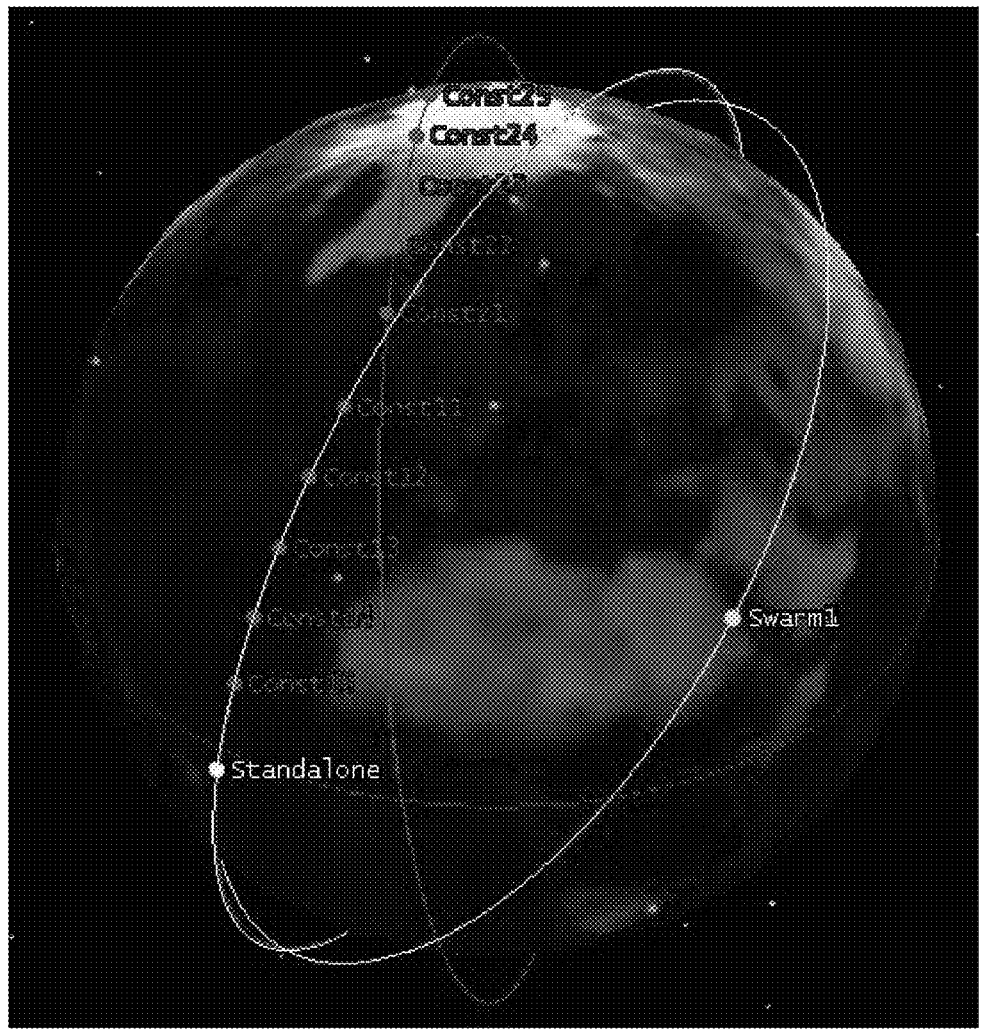
FIG. 12 illustrates S/C arrangement in an example mission.

Table 16 and FIG. 12 show the envisaged example mission configuration. A swarm mission has six S/C within range of 30 km. One of the S/C is a gateway S/C, and others are probe S/C. A constellation mission has two orbit planes with different local time (LT) of ascending node (AN) in sun synchronous orbit (SSO). In each orbit plane, five S/C are arranged in equal distance of 1000 km. These S/C in mission A and B can be launched separately. The capability of HSNs will connect them to each other. Finally, a standalone S/C is arranged in similar orbit to the first orbit plane of the constellation mission but at different altitude.

Figure 13A:
FIG. 13A shows ISL among a swarm, a constellation and a standalone S/C, where the S/C within a constellation in lower altitude are passing the standalone S/C in higher altitude slowly and communicating with it, and the constellation in another orbit plane is also communicating with the other constellation S/C.
Figure 13B:
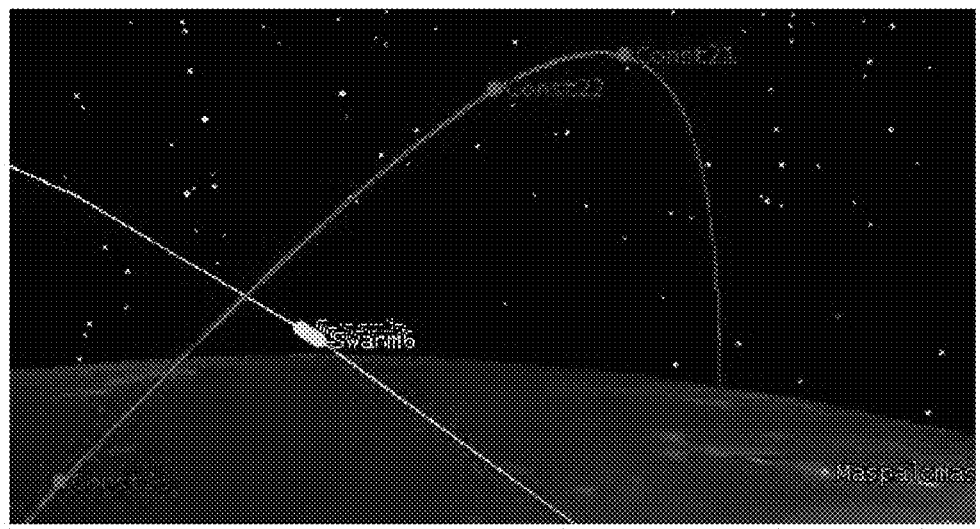
FIG. 13B shows ISL among a swarm, a constellation and a standalone S/C, where the swarm S/C encountered constellations while they are talking to each other within the swarm.

These orbits are selected to see the effect of ISL among different missions. For example, as shown in FIG. 13A, the S/C within a constellation in lower altitude are passing the standalone S/C in higher altitude slowly. The S/C in another orbit plane are also communicating with the other constellation. In FIG. 13B, the swarm S/C are encountering constellations while they are talking to each other within the swarm. Ground stations are selected for each mission to be dispersed around the world.

TABLE 16

Example mission of a HSN: Each mission has
its primary mission objective, while the HSN
augments the value as a whole system of systems.

| Items | Mission A Swarm | Mission B Constellation | Mission C Standalone |
|---|---|---|---|
| Primary mission | Ionosphere monitoring | GPS radio occultation | Imaging |
| HSN mission | Earthquake precursor event monitoring | | |
| Orbit | LEO Inclination = 51 deg | SSO LT of AN = 10:30, 00:00 | SSO LT of AN = 10:30 |
| Altitude | 550 km | 600 km | 650 km |
| # of S/C | 1 gateway S/C 5 probe S/C | 5 gateway S/C × 2 orbit planes | 1 gateway S/C |
| S/C Separation | Scattered within 30 km | 1000 km in-plane | — |
| CBR of each S/C | 32 kbps | 64 kbps | 128 kbps |
| # and name of G/Ss | 3 Santa Clara Cape Canaveral Hawaii | 6 Redu Alaska Maspalomas Kourou Singapore Svalbard | 3 Kiruna Katsuura Santiago |

It is important to simulate orbital dynamics, link margins, and network performance simultaneously. With STK, orbital dynamics are modeled and a CSV-formatted file is generated as an output of simulation results. The output data includes time, position and velocity of each spacecraft. The file is directly loaded and processed by NS-3. Because orbital dynamics are not calculated within NS-3, motion of each spacecraft is treated as a constant velocity model between the last and next position and velocity update. The update interval used in simulation is 30 seconds. The maximum absolute position error during the interval is less than 8 km, and that can be considered to have enough accuracy for a network simulation. NS-3 then simulates packet data traffic. To conduct more accurate position based simulation, STK and the network simulator must be integrated at the PHY layer within the same simulation flow. Some researchers developed a unified simulator called "GEMINI" ([NASA] Glenn's Environment for Modeling Integrated Network Infrastructure) that integrates a network simulator called QualNet and STK. Recently, researchers have developed a STK plug-in called ASTROLINK that can connect STK and NS-3.

NS-3 is an open-source discrete-event network simulator for Internet systems. The software is free and licensed under the GNU GPLv2 license. Compared with the former version of network simulator, NS-2, NS-3 was developed especially for wireless communications and natively supports Wi-Fi protocols, devices and channels. For example, NS-2 cannot calculate RF interferences, but NS-3 can. NS-3 inherits fully matured NS-2 code for wired communications. The weak point of NS-3 (and NS-2) is that it doesn't support antenna pattern models. In S-G links, G/Ss have a high gain, sharp pattern directional antenna pointed toward an S/C so that the G/S cannot typically communicate with other S/C even though they are within communication range of the G/S. However, in NS-3, antenna pattern is always isotropic so that the G/S has the possibility to communicate with other S/C at a same time. In such a case, RF interference may cause higher bit error rate, traffic will be congested by other source nodes and mission data may be interrupted by unnecessary packets sent from other S/C. Therefore, applying NS-3's isotropic antenna pattern model to S-G links is not adequate.

To resolve this problem, a point-to-point link model to the S-G link in the NS-3 simulation was applied, and bit error rate and air propagation delays, calculated from the range between nodes, to the channel were applied. In addition, to simulate Wi-Fi MAC layer behaviors with a point-to-point link model, delays due to DIFS, SIFS, MAC header, and ACK sequences are added to the point-to-point protocol. Equation (11) shows total delay and added delay to the S-G point-to-point one way delay.

$$S\text{-}G\ \text{Delay} = (\text{Point-to-point delay}) + (\text{Added delay}) = (\text{Point-to-point delay}) + \text{DIFS Time} + \text{MAC header bits/PhyRate} + \text{APT} + \text{SIFS Time} + \text{ACK bits/PhyRate} + \text{APT} \quad (11)$$

In the NS-3 simulations, every time a S/C is within the range of a G/S, a point-to-point channel is attached to the network device of both the S/C and the G/S to link up, and the point-to-point channel is detached from the devices when the S/C is out of range of the G/S to bring the link down. In the same manner, every time the link is up, S-G network address space is associated with a gateway relay S/C for OLSR routing, and deassociated when the link is down.

Using Hello messages of the OLSR protocol in the IP layer, each node selects a set of multipoint relays (MPRs) for routing. To define a priority to be a part of MPRs, each node is assigned a parameter called "willingness". The willingness starts from WILL_NEVER where the node is never selected as a MPR to WILL_ALWAYS where the node is always selected. Since probe S/C in the swarm mission have low SWaP, they will never be relay nodes, and their willingness are WILL_NEVER. On the other hand, the gateway S/C in the swarm mission is assigned high priority to be a relay node. Other S/C are assigned WILL_DEFAULT.

TABLE 17

Willingness assignment.

| | |
|---|---|
| WILL_NEVER | Probe S/C in swarm |
| WILL_LOW | — |
| WILL_DEFAULT | Gateway S/C in constellation, Standalone S/C |
| WILL_HIGH | Gateway S/C in swarm |
| WILL_ALWAYS | — |

Figure 14:
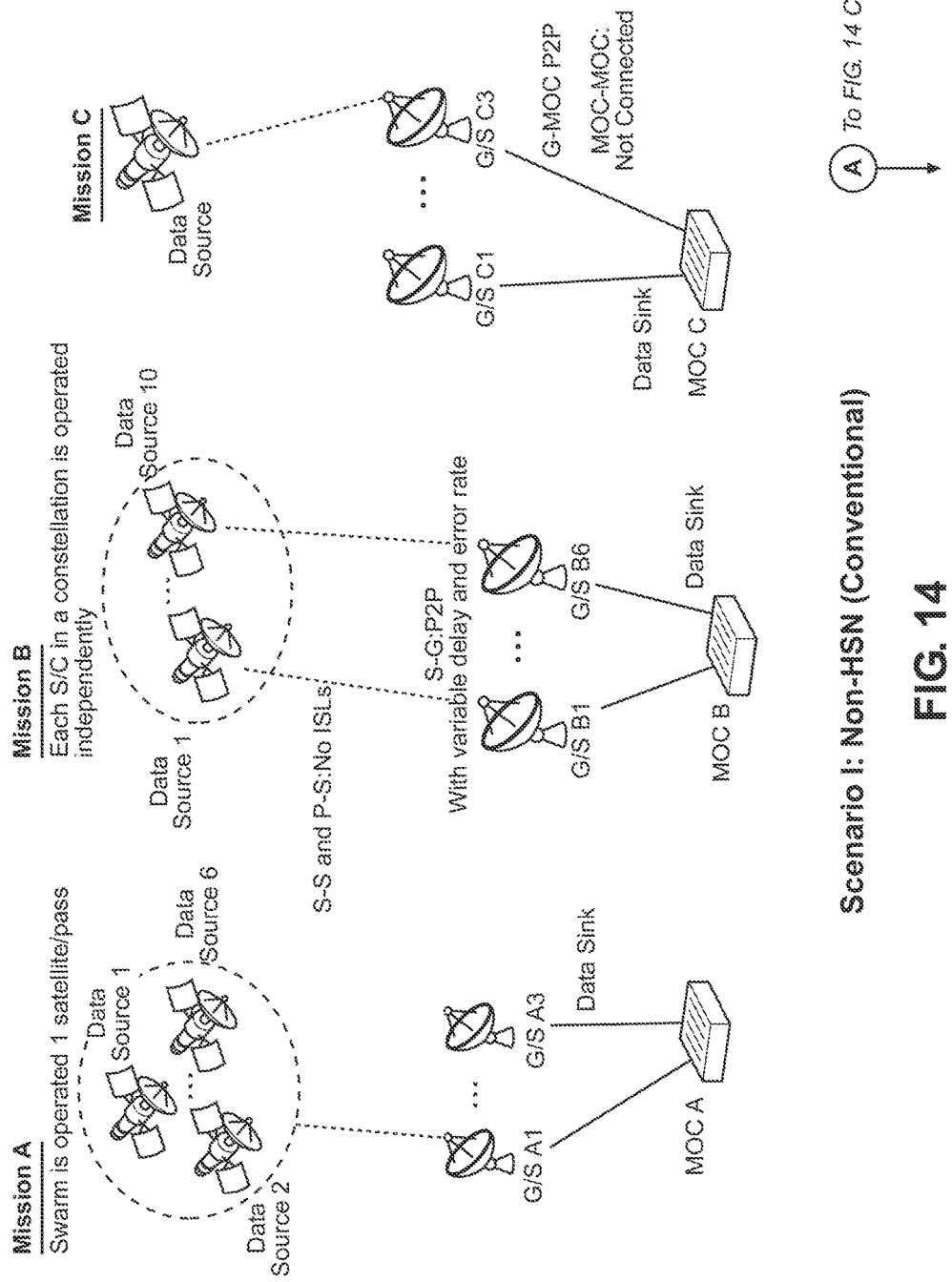
FIG. 14 illustrates example mission simulation scenarios.
Figure 14:
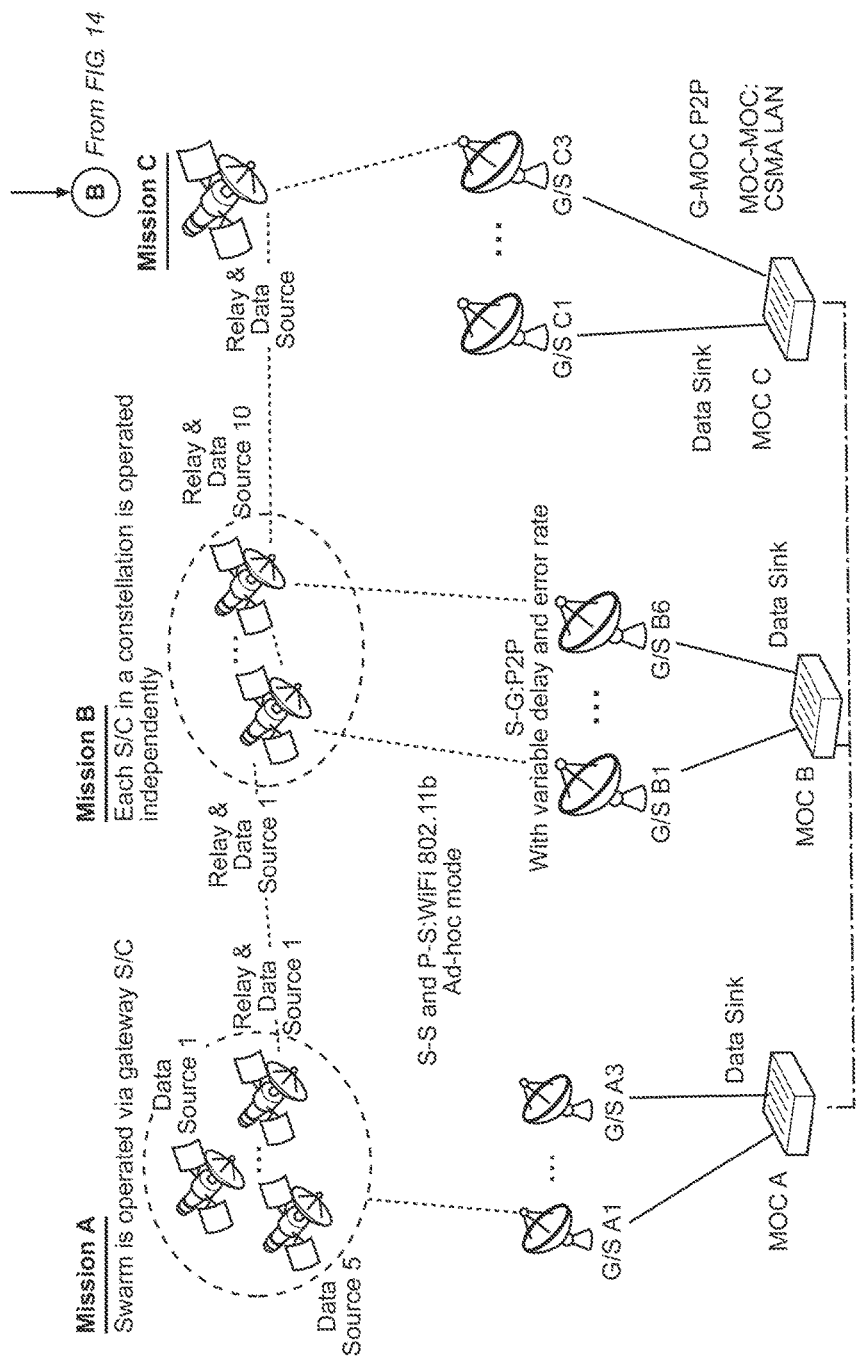
Figure 14:
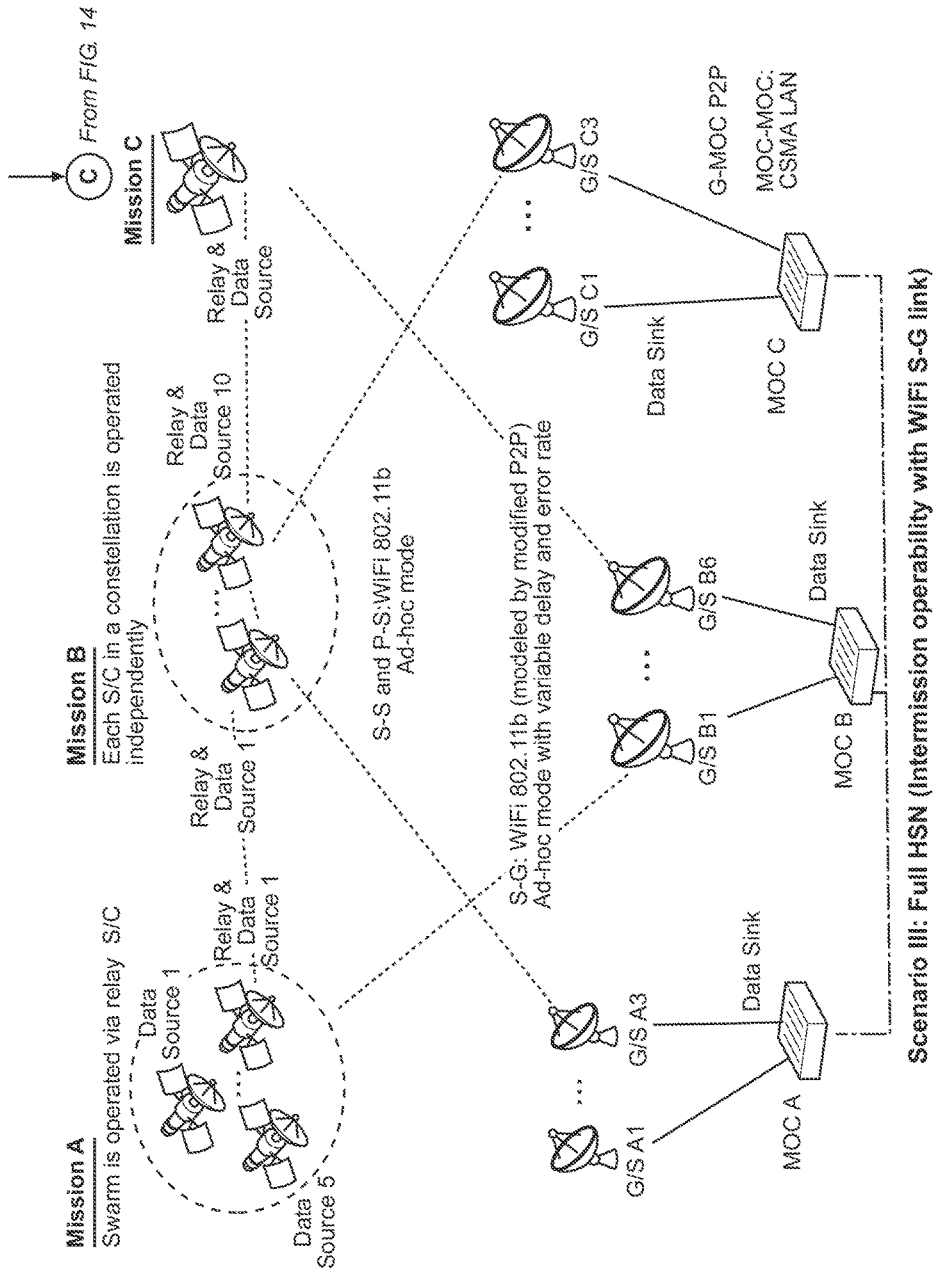

FIG. 14 shows simulation scenarios of the example mission. In order to see the effect of the HSN, three different scenarios were conducted. The first scenario is a conventional one, not using the function of a HSN at all. In this case, even ISL within each mission is not implemented. For each S-G link, a conventional S-band transmitter with a PhyRate of 256 kbps is used. The second scenario is using a HSN for ISL only. Spacecraft are connected using Wi-Fi, but conventional S-band is applied to S-G links. The third scenario is what we call "Full HSN" case. Wi-Fi links connect all the spacecraft and ground stations in this scenario, and spacecraft can be operated through other mission's ground stations.

In all scenarios, G/Ss search for the nearest S/C, and if the nearest one is within line-of-sight, the connection starts with the procedure described above. G/Ss and a MOC are connected via point-to-point link. In the second and the third scenario, MOCs from different missions are connected via CSMA Ethernet. All S/C are installed a source application which generates packets, and all MOCs are installed a sink application which receives the packets. For example in scenario III, data generated at a probe S/C in mission A can be transmitted to the gateway S/C of mission B through the gateway S/C of mission A, then transmitted to the G/S and the MOC of mission C, and finally transferred to the MOC of mission A.

D. Results

Table 18 shows total downloaded data to MOCs per day as a result of a whole day (86400 sec) simulation. As shown in the table, total downloaded data in a full HSN scenario could be increased almost 2.3 times more than non-HSN scenario. Looking into each mission, the amount of downloaded data of mission A increased about 5.7 times in scenario II because of the P-S ISL function added to six S/C within the swarm. The amount of downloaded data of mission C also increased about 1.3 times in the second scenario, because the orbits of S/C in mission B and the standalone S/C are very close, and the standalone S/C could utilize the function of the HSN effectively by transmitting its data to S/C in the constellation. For mission B, the amount of downloaded data did not increase as much as mission A and C in scenario II. In the full HSN scenario, mission A and mission B could increase the amount of downloaded data. This is due to the effect of inter-mission operability with a Wi-Fi S-G link. On the other hand, mission C could not gain a lot by applying the full HSN scenario compared to the HSN ISL only scenario. These differences in the effect of HSN come from different characteristics of ISLs among S/C.

TABLE 18

Simulation results.

| | Total Downloaded Data [MBytes/day] | | | |
|---|---|---|---|---|
| Scenario | Mission A Swarm | Mission B Constellation | Mission C Standalone | Total |
| I Non-HSN | 48 | 637 | 186 | 871 |
| II HSN ISL only | 273 | 732 | 243 | 1,249 |
| III Full HSN | 675 | 1,046 | 246 | 1,967 |

Figure 15:
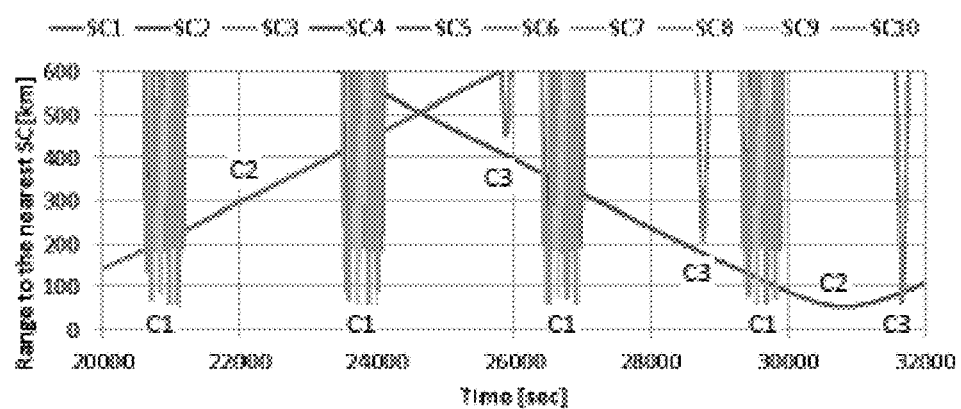
FIG. 15 shows ranges from S/C in the constellation to the nearest S/C.
Figure 16:
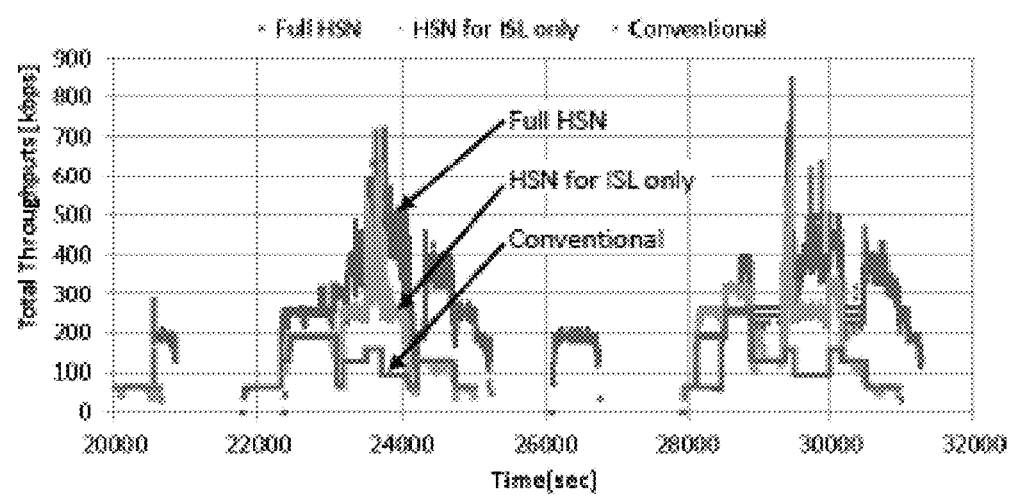
FIG. 16 is a graph illustrating time vs throughputs: comparison among three scenarios.
Figure 17:
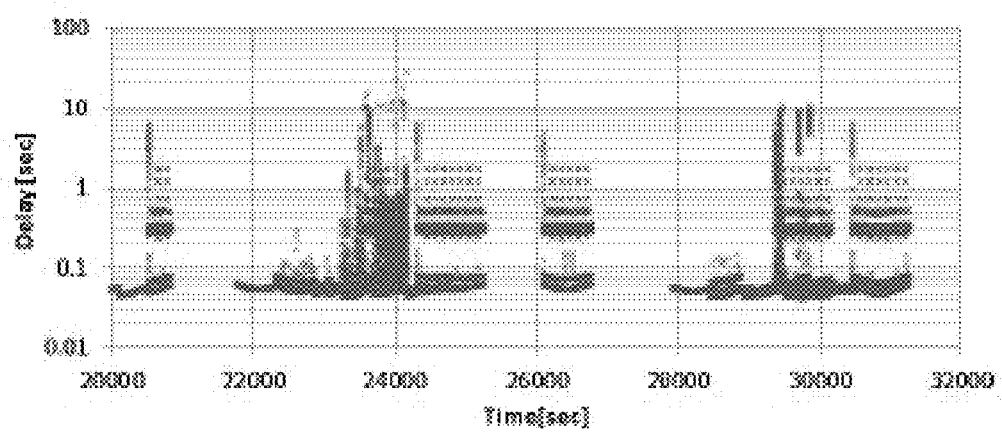
FIG. 17 is a graph showing time vs delays in full HSN scenario.

FIG. 15 shows ranges from S/C in the constellation to the nearest S/C for 12000 seconds, which is about two orbit periods for LEO. In the figure, there are three different types of conjunctions. The first can be seen four times around 20900 sec, 23800 sec, 26700 sec, and 29600 sec in the figure as C1. This is due to conjunction among S/C of two constellation orbit planes. The second can be seen through whole time period with shallow slopes in the figure as C2. This is conjunction between the standalone S/C of mission C and S/C from a constellation. These two types of conjunction can be seen in FIG. 13A. Because the standalone S/C has already fully benefited from the HSN in the second scenario, mission C couldn't gain a lot in scenario III. The third can be seen three times around 25900 sec, 28800 sec, and 31700 sec in the figure as C3. This is conjunction between swarm S/C and S/C from a constellation, and that can be seen in FIG. 13B. Average duration of communication for the first type and the third type of conjunction is around 180-240 seconds. FIG. 16 and FIG. 17 show throughputs and delays. These throughputs and delays are measured at the application layer. Even though the duration of an interspacecraft link is relatively short, links are established and data is relayed. Total throughput increases when these conjunctions occur, and at the same time, end-to-end delay also increases. As shown in the figure, end-to-end delays are less than 0.1 sec most of the times. However, sometimes delays increase to more than 10 seconds. These big delays are due to the increased data traffic and OLSR message traffic among ISLs. Throughput sometimes goes down to zero due to positional relation of S/C and ground stations.

E. Conclusion

From the results of the analytical design of each communication layer and simulations, characteristics of HSNs could be understood. Effective scope and limitations of HSNs are indicated below.

1. With modified parameters, Wi-Fi technology and open-standard protocols can be applied to ISLs and S-G links to achieve HSNs.
2. For LEO S/C which have orbit planes close to each other, HSNs will increase the ISL traffic greatly. The maximum throughput for S-S link is 505.7 kbps for range of 550 km and 867.7 kbps for range of 55 km. But these maximum throughputs must be divided by the number of S/C within communication range to obtain actual effective maximum throughput per a single S/C.
3. For LEO S/C whose orbit planes are not so close, HSN won't increase the ISL traffic. However, inter-spacecraft connection can be established during the short conjunction period, and that will contribute to exchanging information between S/C for correlating data or for enhancing space situational awareness.
4. Applying HSN to the S-G link and achieving intermission operability with common open-standard protocols will increase the total throughput greatly. But the maximum throughput for each S-G link is limited up to 275.9 kbps for 3100 km range. Thus, this approach is valid especially for small spacecraft, whose number is large and which don't have higher rate S-G transceivers.

It is also contemplated to apply Delay/Disruption-Tolerant Networking (DTN) as a bundle layer to improve the performance and functionality of HSNs. DTN will increase the total throughput of downlink data to G/Ss. DiffServ for different types of data policies in MS data and HK data will be applied as well.

As provided above, maximum throughputs analytically for G-S, S-S, and P-S links have been calculated. For long range Wi-Fi, air propagation time is one of the limiting factors of throughput. There is a relationship between packet size and bit error rate. To minimize the time occupied by air propagation time, packet size should be larger. On the other hand, to minimize bit error rate, packet size should be smaller. Thus, in a real mission design, there must be a trade study based on required throughput and amount of data to send.

The use Wi-Fi for space-to-ground link was also described. In the NS-3, antenna pattern is always isotropic. Thus the G/S, which has large and sharp antenna gain, had possibility to communicate with other S/C at a same time. To resolve this isotropic antenna pattern modeling problem for space-to-ground link in the NS-3 simulator, modified point-to-point link model to simulate bit error rate and delays was applied.

Simulation results showed that HSN for ISL only scenario works to increase throughput of each mission. With a full HSN scenario, total throughput could be increased 2.3 times more than non-HSN scenario. For LEO S/C which have orbit planes close to each other, HSNs will increase the ISL traffic greatly. For LEO S/C whose orbit planes are not so close, HSN won't increase the ISL traffic. However, interspacecraft connection could be established during the short conjunction period.

Finally, it should be noted that increased throughput is just one aspect of benefit of HSNs. The true motivation that underlies many institutions to join in HSNs is its capability of simultaneous complementary and correlated data collection from a large set of distributed spacecraft, and giving an additional value to the original missions. Cost effectiveness can be achieved by broader participation from different institutions.

III. Wireless Network Technology Assessment

Constellations of small satellites are useful for a number of earth observation and space exploration missions. The Heterogeneous Spacecraft Network project is defining operations concepts and promising technology that can provide greater capability at lower cost. Typically, such spacecraft can communicate with each other in orbit and with ground stations for spacecraft operation and downlink of science data. However, small spacecraft often cannot utilize the capability delivered by networks such as the Universal Space Network, even if the mission could afford the cost. Small spacecraft have significant constraints in terms of power availability, attitude stability and overall mass and volume, requiring innovative technology for implementing highly functional satellites. A major challenge for such missions is selecting communications technology able to function in the space environment, able to meet the requirements for both inter-satellite and space-to-ground data links and fit within the resources available on small satellites.

Moreover, the cost of the technology needs to be as low as possible to facilitate participation by a broad range of organizations. Finally, the communications networks should conform to standards allowing broad adoption and the use of common infrastructure for multiple missions. Communications technology based on the IEEE 802 family of local area and metropolitan area network standards can be adapted to meet the needs of such missions. The following disclosure identifies possible development paths for improved communication between small satellites and to the ground by reviewing and evaluating standards-based technology for use by small satellite missions. Methods for greatly extending both range and data rate are provided and analyzed. Also, the IEEE 802.11 wireless network standards, the ITU WCDMA 3G cell phone standard and the IEEE 802.15.4 Personal Area Network standard are reviewed and evaluated. A simple set of communication requirements define the trade offs between standards and identify the technical capability needed for such missions. Specifically, the improvements needed to the Physical Layer to extend range to 1200 Km and the ability to comply with spectrum management constraints will be investigated. Authentication and encryption is addressed along lwith adjustments to the Media Access Control layer that optimizes data transfer rates over a broad range of distances and conditions. The primary objective of HSNs is to greatly reduce the cost of data communication for small satellites by establishing a common infrastructure able to meet the needs of most missions.

Small satellites offer advantages in terms of cost and launch opportunities. CubeSats based on the standards defined by California State University at San Luis Obispo offer educational opportunities for aerospace engineering students as well. These spacecraft often use UHF beacons or RF modems operating in unlicensed Instrumentation, Scientific and Medical bands (ISM) around 900 MHz and 2.4 GHz. The following disclosure studies the use of wireless network standards for both space-to-ground (S-G) and space-to-space (S-S) communications for missions consisting of a constellation of small satellites. Improvements in communications capability can be realized by upgrading the communications link to higher performance using openly available standards such as IEEE 802.11 and commercial hardware and software from numerous manufacturers. This leads to a network of compatible ground stations able to support small satellite missions at low cost while delivering high overall performance and able to be used by a large range of organizations—the vision for Heterogeneous Spacecraft Networks (HSN).

The HSN project developed a concept for low-cost operation of small satellites in LEO where multiple organizations can collaborate using the Internet and emerging Information Technology like Cloud-based resources. The HSN project evaluated standards and performed network simulations to validate the proposed technology.

Three standards for terrestrial communication applied to space communication at the Physical and Media Access Control Layers are provided. Also provided are the requirements for small spacecraft communication, the standards and technology available and the engineering tradeoffs involved in deciding which standards and products to employ for an actual mission. Furthermore, the following reviews the current practice and state-of-the-art and looks at the limitations of wireless network technology for addressing space communications and most importantly, what simple improvements can be made to extend the existing capability for space use.

Radio modems based on proprietary protocols such as the Microhard MHX2400 have been used for CubeSat missions such as OREOS. They operate in the 2.4 GHz ISM band and can meet FCC requirements when operated by a University or other private entity. They generally use dedicated ground stations set up specifically for the mission. Another approach is the use of UHF beacons or even UHF-band radio modems for high-performance. The UHF beacon approach generally uses a network of amateur radio operators for receiving the signals and interpreting the low-rate data. For high data rates, the OSAGS mission used a network of special ground stations ultimately capable of delivering 100 Mbps from three sites and represents the best effort to date. Most of these solutions are point-to-point communication systems, and cover a wide range of missions and costs.

NASA Ames Research Center, under the Edison and Franklin Programs, initiated a trade study that looked into the use of WiFi IEEE 802.11 communications for CubeSats in LEO. The following disclosure goes further in evaluating and comparing other standards such as Personal Area Networks (PAN) (IEEE 802.15.4) technology such as ZigBee and 3G cell phone standards based on Wideband Code Division Multiple Access (WCDMA) protocols. These technologies use the unlicensed ISM band, or similar licensed bands and the standards are flexible enough to meet diverse requirements.

A. Communication Requirements

Small satellites have physical size constraints that prevent the use of large high-gain antennas. They also have low power solar arrays and small batteries; so they will only support small transceivers. In fact, the power available is so low as to require the use of duty cycle limits for communications. Moreover, the use of directional antennas to improve link margin and increase range requires some attitude stabilization for pointing, a feature not found in many small satellites.

Small satellites are often built and operated by organizations such as Universities that do not have large financial resources to conduct missions. Therefore the availability of low-cost technology and its utility for serving multiple missions are truly advantageous. By looking at various small satellite missions either flown or proposed, a reasonable set of requirements can be created that allow evaluation of standards and technology able to meet them.

One key requirement would be range, in terms of the overall distance between communicating objects, either between spacecraft (S-S) or between the spacecraft and the ground (S-G). For LEO missions, 1200 Km is a good working figure for the S-G link, providing good coverage to reasonable altitudes of about 600 Km. For the S-S link, 200 Km would be a good figure for most constellations deployed during a single launch. These numbers come from various mission designs and represent an average of anticipated requirements.

A large dish is needed on the ground, providing gain for increasing range. These vary in size from 1 meter to about 35 meters in diameter, with the larger dishes having a very narrow beamwidth requiring significant point accuracy to see the spacecraft in orbit. A 3 meter diameter dish producing about 35 dBi in gain is assumed for the ground station antenna. This dish will require highly accurate tracking to follow the spacecraft as it passes overhead once every orbit with pointing accuracy within one degree. The latitude of the ground station is equally important. For low-inclination orbits sites near the equator have significantly greater coverage, but for sun-synchronous orbits ground station sites near the poles are better. There are no assumptions regarding location of the ground station, but does assume a fixed antenna size and a compatible transceiver.

The power available on the spacecraft is also a known quantity. For 1.5 U Cubesats for example, 15 W peak can be sourced for a few minutes, with less than 1 W available continuously for the communications subsystem. The 15 W peak power produces about 1 W of RF transmit power to the antenna for most transceivers operating at 2.4 GHz. The antenna has a gain of about 1.5 dBi for a dipole or quadrapole radiator and about 5 dBi for a directional patch antenna. These types are typically used for CubeSats and the 5 dBi patch is assumed for the spacecraft antenna, which needs some degree of attitude stabilization for pointing.

B. Evaluation Method

The two lowest levels of the OSI network model, the Physical (PHY) layer and the Media Access Control (MAC) Layer, which controls link access and data flow are covered below. The primary objectives are to define PHY or radio characteristics useful for small satellite missions such as transceiver type, transmitter power and antenna configurations based on the proposed standards. The spacecraft transponder and the ground station characteristics will be described, leading to a complete solution. The range and data rate are the primary quantitative comparison factors. The cost in terms of spacecraft size, weight and power consumption (SWAP) will be estimated as a qualitative Figure of Merit (FOM) in the analysis. Most 802.11 wireless network standards use spread-spectrum for radio communications, which differs from narrow-band communication and requires special analysis. The following disclosure presents a first order analysis of the effect of spread spectrum techniques when applied to space communications and quantitatively compares the performance of each standard.

The corresponding MAC layer protocols also determine a given standard's applicability for space mission operations. The MAC layer handles association and authentication of nodes, as well as low-level data flow control. Most MAC standards support simultaneous multi-way communications, a key attribute of networks. The MAC layer is the key for establishment of spacecraft networks, either between each other in orbit, or to multiple ground stations. The MAC layer turns point-to-point radio links into a capable network using access control and data link control mechanisms specific to each standard. The different standards provide support for different topologies and require different methods for network establishment and fault management. For example, WiFi uses either an access point or can communicate directly between two devices, while ZigBee creates ad-hoc hierarchical PANs. The resultant data rates under realistic conditions are a key figure of merit (FOM), along with the network topologies supported, the method of association and authentication and the ability to juggle many concurrent links under realistic orbital conditions. These attributes will be included in the table of FOMs used to compare the standards.

The analysis consists of a basic link margin analysis where the PHY layer is implemented in a pragmatic manner using available antenna technology and within spacecraft SWAP constraints. Theoretical versus typical values are compared for each standard and include the effects of spread spectrum modulation. The transceiver and antenna characteristics are defined by looking at the current product lines available in the commercial market. Moderate ground station antenna size is highly desired, driving the solution trade space. The constraints on spacecraft power in particular pose interesting challenges for link management. A table of the overall benefit of each standard will be constructed using the derived FOMs.

The primary link is the one from the spacecraft to the ground station, which allows mission operators to receive telemetry from the spacecraft, send commands and to collect payload data. The ground station is almost always a parabolic dish, which provides significant gain along precise directional beams over a large range of frequencies. Dishes can range in size from 1 meter to over 70 meters in diameter for the large Deep Space Network antennas. A one meter dish will work for LEO, while a 70 m dish will receive signals from the edge of the solar system. The corresponding gains are 10 dBi and 63 dBi (at 2.4 GHz) respectively.

For a parabolic dish, the gain scales with dish size using the following equation:

$$G(\text{numeric}) = \pi^2 d^2 / \lambda^2 \quad (12)$$

where d is diameter in meters and λ is the wavelength. An efficiency factor needs to be applied, in the range of 0.6 to 0.9 to get actual performance and the numeric value is often expressed in dB. The corresponding beamwidth is given by:

$$\theta(\text{degrees}) = 70 \lambda / d \quad (13)$$

For a 3 m dish, the gain is 35 dBi with a beamwidth of 3 degrees and this is our reference configuration for the trade study.

The space to ground (S-G) link must be robust and reliable, as mission success depends upon it. There is also a correlation between a spacecraft's orbit and the location of the ground station on earth, which sets the schedule for satellite data access and duration, commonly called a communications pass. For example, a low inclination LEO mission would use ground stations near the equator, while a sun-synchronous polar orbit would favor ground stations near the poles. These alignments produce the highest duration and frequency of communications passes for these types of orbits.

The ground station does not have the same constraints as the spacecraft. For example the parabolic dish antenna can be much larger and the transmit power and duty cycle much higher. This can increase range and data rate, but can result in asymmetrical characteristics for the link. Due to spacecraft transmit power limits, the downlink can be less powerful than the uplink. Also, the dish antenna needs to track the spacecraft. A skilled team of radio engineers, a significant cost factor, usually performs tracking and acquisition of the spacecraft signal. Automation of antenna tracking could significantly reduce overall ground station operational cost, while increasing antenna cost, and will be considered. An array of sector antennas is a possible alternative, based on the cell phone tower approach.

The spacecraft antenna usually has directional response, as indicated by its radiation pattern. The radiation pattern must be pointed toward the earth station within the beamwidth of the antenna to support communications. This drives requirements for spacecraft attitude stabilization and pointing. Omni-directional antennas like monopoles or dipoles produce wide toroids and multi-element quadrapoles create a non-symmetrical spherical pattern. Higher directionality results in higher gain, but this drives pointing accuracy higher as well. To accurately point its antenna, a spacecraft must have a reasonable idea of its orbital position and the location of the ground stations.

Attributes of the S-G link would be antenna gain, beamwidth and pointing accuracy, and maximum range. The transmit power, antenna gain, free-space loss and receiver sensitivity determine the resulting link margin.

In contrast space-to-space (S-S) links are between spacecraft in orbits where they have direct line-of-sight with each other and are within range of the communications links. Unlike S-G links, it is difficult to have a large dish on a small spacecraft, so range will be much shorter. Transceiver power is also limited, further reducing maximum range. Finally, directional antennas need to be pointed at the other spacecraft, so orbit knowledge and precision attitude control is needed as well for effective S-S communications. The broad patch antenna used as our reference design has 80 degrees of beam width so that simple passive attitude stabilization might suffice.

Range of operations scales indirectly with data rate. Each doubling of data rate represents a loss of 3 dB in link margin, reducing range by a factor of 0.7. Therefore, this general rule-of-thumb can be used to estimate the range provided using higher data rates. For S-S links, the distances are generally much shorter than S-G, so data rates can be correspondingly increased under many circumstances.

One key aspect for multi-way link use is to understand the connection topologies supported by the various standards. These progress from point-to-point, to star and tree type topologies.

Figure 18:
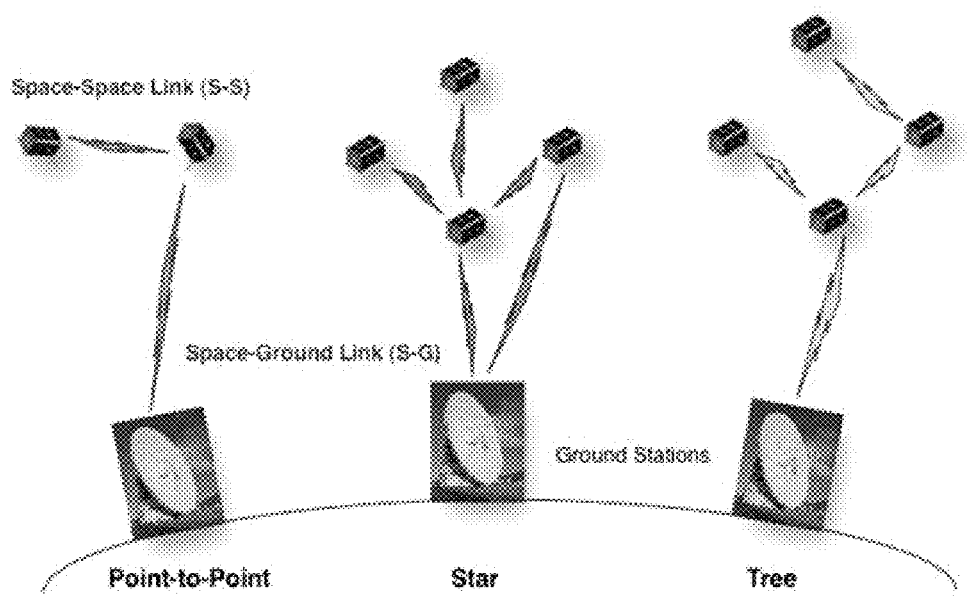
FIG. 18 illustrates communication network topology.

Referring to FIG. 18, most space communication links conform to the point-to-point (P2P) model, that is, from a single spacecraft to the ground station, or from one spacecraft to another as shown in the leftmost diagram. Moreover, most RF links really only send data point-to-point, simulating multi-way links by sending packets sequentially using time slots to create the illusion of concurrent connections. Radio modems, Bluetooth and WiFi 802.11 in ad-hoc mode are examples of point-to-point networks. The blue links in the diagram correspond to the S-G or S-S links respectively. Addressing is also point to point, where the ground station specifies the MAC address of the spacecraft it wants to communicate with.

A good example of the star configuration is WiFi operating in infrastructure mode, with the access point acting as the central point or hub of the star. All wireless access is mediated and coordinated by the access point. All client nodes must see the access point in order to participate in the subnet. In the middle diagram, either the ground station or a selected spacecraft functions as the hub of the star network. The orange links would allow communication with multiple spacecraft (within the beamwidth of the antenna) with the ground station as the hub. The green links represent the case where a given satellite is the hub, able to communicate with all other satellites within range. Star networks often support handover from one hub to another, called roaming, implemented in WiFi and 3G. Cell phone networks have a similar topology, with the cell phone tower as the central node. Due to the complexity of the cell phone hub, it is likely only to be resident on the ground station.

Finally, the tree network configuration is very similar to wired Ethernet with multiple subnets connected to a router. It forms a network from a "root" node and creates a tree with many branches forming from each node. The root node forms the network and often provides the gateway to other networks like the Internet. The intermediate nodes often support routing functions to the end-point nodes, which act as the leaves of the tree. Tree networks often incorporate mesh routing to enhance data delivery reliability and extend the overall range of the network through routers acting as repeaters. The rightmost diagram shows the approach with either the ground station or a selected satellite acting as the root and each configuration looks the same as represented by the yellow links.

The best network topology depends upon the desired mission configuration, the number of satellites and ground stations, the separation between the spacecraft and the amount of data throughput needed. Point to point is the only solution for most simple missions where there are simply not enough nodes to create any other type of network. Star topology would be best for networks where a central node, often the ground station, desires to communicate with multiple spacecraft located in close proximity, like a closely coupled cluster of satellites. The tree topology is best for complex missions, as it supports both ad-hoc network formation and automatic routing of data.

C. Standards Comparison Three standards, a wireless general purpose network based on the IEEE 802.11 standards, a wireless sensor network based on IEEE 802.15.4 and ZigBee and a cell phone network based on the ITU 3G WCDMA standard are compared below.

The WiFi family of standards consists of the IEEE 802.11, 802.11b, 802.11g and 802.11n methods, each using either Frequency Hopping Spread Spectrum (FHSS) or Discrete Sequence Spread Spectrum (DSSS) modulation for co-existence with other WiFi networks. They all use the 2.4 GHz ISM band and just vary in the exact type of modulation, the amount of frequency spectrum utilized and their resultant data rates. The 802.11b standard uses CCK and QPSK modulation, while the 802.11g standard uses Orthogonal Frequency Division Multiplexing (OFDM). 802.11n is just 802.11g using a wider range of the ISM band and Multiple-In-Multiple-Out (MIMO) antenna technology to deliver up to 300 Mbps of raw data rate. The FCC limits these devices to an Effective Isotropic Radiated Power of 1 W.

WiFi uses the SSID parameter to identify the network and devices with the same SSID either connect to an Access Point for Internet access (infrastructure mode) or can use ad-hoc mode to setup direct connections with each other. The MAC layer works by using Carrier-Sense Multi-Access (CSMA) for arbitrating access to the wireless medium, in effect juggling multiple connections at the packet level. A beacon packet is used for coordinating the network, periodically determining network membership and assigning time slots for better utilization of the medium. All data transfers are direct from source to sink, with the access point only coordinating the transfers. It is essential that all the nodes of the network receive and respond to the beacons from the access point. Ad-hoc mode uses the exact same methods of media access, but does so only on a point-to-point basis. Even the beacons are point-to-point, as are the means of establishing a connection. Ad-hoc mode is more flexible, but is less effective at managing overall network throughput. These networks create data packets that resemble Ethernet and usually use TCP/IP or UDP protocols for user data transfer.

Management of the SSID names can help configure dynamic networks with multiple members. The MAC supports secure authentication and link encryption by exchanging keys upon association. For infrastructure mode, the device requests association using a given SSID, the access point allows association if the SSID matches its own SSID, and then can proceed to authentication, where passwords and encryption keys are exchanged and checked.

The resulting topologies are either a star network or a collection of point-to-point links. WiFi can support space-to-space links using ad-hoc mode. If the ground station is an access point in infrastructure mode, the ground station is the central node of the star and can actually support connections to multiple satellites simultaneously, which could improve overall mission throughput considerably.

For longer distances, the MAC timing has to be adjusted to account for the much longer latencies produced by light speed delays. Several papers have been written about how to accomplish this. Basically, the interpacket and interframe spacing needs to be increased for longer distances.

Only 802.11b running at the lowest data rate of 1 MHz is evaluated. This represents the best case in terms of range performance, with the other variants providing significantly higher data rates, but with significantly shorter range.

The IEEE 802.15.4 standard for Personal Area Networks (PAN) was created to support low-power sensor networks. The ad-hoc protocols for network formation produce trees consisting of full-function devices (FFD) capable of routing data and reduced function devices (RFD) generally producing the data from sensors. The root node is called the coordinator, and is necessary to initiate network formation. Once a network is formed, the coordinator can then act as the network gateway to terrestrial wired networks. Routers can also act as gateways, but RFDs cannot.

The ZigBee protocol, running above the 802.15.4 layer uses Ad-hoc On-demand Distance Vector (AODV) routing to support mesh networks where intermediate routers support dynamic network configurations and route data through the network despite changes in the physical layout. Superior routing and ad-hoc formation are key advantages for missions where large numbers of satellites gather large amounts of data.

The MAC is also based on CSMA like 802.11 but the data packets do not look like Ethernet frames. The ZigBee protocol supports either profiles or applications providing a rich environment for customization of MAC functions and adjustment of key parameters. The ZigBee framework provides support for application programs that can help create templates for ease of software porting and extension of function. It is anticipated that similar changes to the MAC-layer timing would be needed to adapt the network timing to the longer distances required for space use, much in the same manner as for 802.11.

The typical mission configuration might consist of a collection of spacecraft, with the smallest supporting RFD nodes and the intermediate ones using FFD. Small spacecraft can be used to gather data, storing it temporarily until within range of another FFD spacecraft that can act as a router. The FFD is also able to downlink data to the ground station. The RFD nodes collect data; send it to the FFD nodes, which in turn downlink to the Ground Station during a communications pass. Therefore much of the functionality involved with Delay Tolerant Networking is embedded in these MAC-layer protocols.

Wideband Code Division Multiple Access (WCDMA) is commonly known as 3G for cellphone data transmission as an ITU standard and may be particularly useful for small satellites. Unlike the other standards (many of which are part of 4G upgrades), this standard is designed for longer haul on the order of several miles at power levels of about a watt or two. The spreading function occurs over a smaller bandwidth, greatly increasing sensitivity by limiting thermal noise. The lower data rates (12 Kbps) result in high processing gain, also increasing sensitivity by effectively lowering the noise floor. Typical receivers are orders of magnitude more sensitive than WiFi transceivers as a result, with important caveats. For high rate data transmission (384 Kbps), the range is greatly reduced by a factor of about −10 dB, resulting in range comparable to WiFi. Moreover, while the cell tower transceiver has high sensitivity, (−121 dBm) the mobile transceivers have −4 dB less sensitivity (−117 dBm), reducing range for spacecraft transceivers. Finally, the cell tower transceivers can use up to 2 W of RF transmit power, while the mobile transceivers range between 0.1 W to 1 W output power. This standard also requires use of licensed spectrum in the 1.9 and 2.1 GHz bands.

The MAC layer handles call management using cell phone protocols. This again creates a barrier to easy adoption, as these protocols are very specialized and are not directly TCP/IP compatible. In general, circuit switched (voice), packet switched (data) and control plane data are handled on multiple channels. The data rates can vary from 12.5 Kbps for voice to 384 Kbps for data traffic and multiple rates can be supported simultaneously, but with widely varying link range and quality. The link is also assymetrical at high data rates, with uplink to the base station much slower.

An interesting feature of cell phone towers is the use of multiple sector antennas covering a full 360-degree plane perpendicular to the tower for terrestrial use. Imagine turning the cell tower on its side, and aiming the multiple sectors skyward. The automatic antenna switching capability could be used to create a tracking ground station without the use of electromechanical components. Since much of the engineering has been done, it is more a matter of adapting this work to space use.

D. Spread-Spectrum Analysis

Most space communications is based on narrow-band signals containing a modulated data stream, where the bandwidth used is not a significant proportion of the carrier frequency. For example at a 2 GHz carrier frequency, the deviation caused by modulation would be a few megahertz.

These signals carry the farthest for a given transmit power and it is easy to build high-sensitivity receivers using resonant circuits. Wireless network and cell phones by contrast use spread-spectrum communications for their radios, spreading the overall bandwidth required significantly in order to promote harmonious co-existence of multiple radio systems within the same geographical area. The chief benefit of spread spectrum is low detectability and high immunity to interference. For wireless networks, the interference immunity is the main reason the standards all require the use of spread spectrum.

There are various types of spread-spectrum, such as Direct Sequence (DSSS) or Frequency Hopping Spread Spectrum (FHSS) or Orthogonal Frequency Division Multiplexing (OFDM), all relevant to wireless network standards. A first-order analysis applies to DSSS radio systems, and WiFi 802.11b is compared to WCDMA and to ZigBee based on the IEEE 802.15.4 standard.

The effect of spread spectrum, where the main carrier is modulated by a spreading function prior to having the data modulation added, is to increase the bandwidth of the carrier signal, necessitating a wide bandwidth receiver front end. Since receiver sensitivity is limited by thermal noise and is proportional to input bandwidth, spread-spectrum receivers have lower overall input sensitivity. This is given by:

$$N_t(dBm)=10 \log(KTB_{rf}) \quad (14)$$

where K is Boltzmann's constant, T is temperature in K and $B_{rf}$ is input bandwidth. The Processing Gain (PG) is the ratio of bandspread to data rate and is given by:

$$PG(dB)=10 \log(B_{rf}/R_{bit}) \quad (15)$$

where Rbit is the effective data rate.

The Processing Gain is applied to the input noise, effectively lowering the noise by the PG value. A certain signal to noise ratio results in a certain bit error rate (BER) and this varies dependent upon exact modulation and spreading function. However, an average can be used, so 5 dB is chosen based on the characteristics of the chosen transceivers. The proper combination of these values can yield the theoretical maximum input receiver sensitivity $R_t$ (limited by thermal noise) as given by:

$$R_t=N_t+PG-Eb/No \quad (16)$$

Moreover, the standards often specify a minimum implemented receiver sensitivity and typical products can conform to or exceed these values. Note that actual sensitivity can never exceed the adjusted thermal noise limit. The results of these calculations are summarized in the table below.

TABLE 19

Spread Spectrum Characteristics.

| PARAMETER | WiFi | WCDMA | ZigBee |
|---|---|---|---|
| Frequency (MHz) | 2450 | 2100 | 2450 |
| Data Rate (Rbit MHz) | 1 | 0.012 | 0.25 |
| Chip rate (Brf MHz) | 11 | 3.84 | 2 |
| Proc Gain (dB) | 10.41 | 25.05 | 9.03 |
| Thermal Input noise (dBm) | −103.56 | −108.13 | −110.97 |

TABLE 19-continued

Spread Spectrum Characteristics.

| PARAMETER | WiFi | WCDMA | ZigBee |
|---|---|---|---|
| Maximum Bit Error Rate (BER) | 1.00E−03 | 1.00E−03 | 1.00E−03 |
| Required Eb/No (dB) | 5 | 5 | 5 |
| Effective Noise Floor (dBm) | −113.98 | −133.19 | −120.00 |
| Theoretical Receiver Sensitivity (dBm) | −108.98 | −128.19 | −115.00 |
| Allowable Noise Factor | 28.98 | 7.19 | 30.00 |
| Specified Recv. Sens. (dBm) | −80.00 | −121.00 | −85.00 |
| Typical Recv. Sens. (dBm) | −95.00 | −117.00 | −98.00 |

The main figure of merit is the theoretical receiver sensitivity, which determines the ultimate limit for link performance using the specified standard. However, the specified receiver sensitivity and the typical receiver sensitivity are equally relevant since they are the best indicators of actual performance. The Specified Receiver Sensitivity is the minimum sensitivity that complies with the standard. The Typical Receiver Sensitivity is the sensitivity of representative products that conform to the standard. The most relevant parameter for actual performance is the Typical value. The Theoretical value can be used to determine how much improvement is possible using low-noise preamplifiers.

One exception is that WCDMA specifies two different values for sensitivity, one for the base station in the cell tower and the less sensitive one for mobile handsets. The mobile handset number is used for the Typical value, since it is representative of the spacecraft transceiver. The cell tower transceiver value would be used for the ground station.

The interference rejection is provided by the spreading function, so wider spreading produces better interference performance. The numbers show that WiFi and ZigBee are fairly equal in interference rejection with WCDMA providing just about one quarter the interference rejection. High interference rejection provides the capability of either running in high noise environments, or having many wireless subnets running simultaneously. Since WCDMA access is moderated by the code division access protocol, it does not need as much interference rejection in the PHY layer as CSMA access protocols.

Using the table above, the best choice for long range is WCDMA, followed by 802.15.4 (ZigBee) with WiFi taking up the rear. The difference between ZigBee and WiFi is about a factor of two. These results are consistent with known and measured link performance and will be used in the link margin calculations to produce the representative FOMs for range.

E. Physical Layer Link Margin

One must be able to receive the RF energy and interpret its information content. This requires the received signal to be demodulated properly after traveling through space (free space loss) and in the presence of noise (noise floor). Only when the signal strength is greater than the receiver sensitivity can the information be decoded. There is a direct relationship between received signal strength and bit error rate (BERR) or packet error rate (PER). Generally a margin of +5 dB results in an acceptable BERR of 10E−5 or 1 error in 10E5 bits of data. Note that this is a high error rate, so even greater margins are needed for robust links.

The effect of data rate is that for each doubling of data rate, there is a concurrent loss of 3 dB of link margin because the signal required for providing a given error rate needs to also double. The parameters required for link margin calculations are generally not available from the chipset manufacturers. Instead, the manufacturers specify the resultant receiver sensitivity for each of the modes supported by the chips. The link margin tables summarize this data as the Typical Receiver Sensitivity value culled from numerous communications chip providers.

The table below outlines the anticipate performance of each standard using a 3 m dish (35 dBi gain) for the ground station and a wide-angle patch antenna (5 dBi gain) for the spacecraft. Polarization, rain and pointing losses are typical for DSN operation. Both the maximum range and the typical range calculations are shown.

TABLE 20

Typical Space to Ground Link Margin.

| PARAMETER | WiFi | WCDMA | ZigBee |
|---|---|---|---|
| Frequency (MHz) | 2450 | 2100 | 2450 |
| Data Rate (Mbps) | 1 | 0.012 | 0.25 |
| Gnd Transmit Power (Watts) | 1 | 1 | 1 |
| Gnd Transmit Power (dBms) | 30.00 | 30.00 | 30.00 |
| Gnd Antenna Gain (dBi) | 35 | 35 | 35 |
| Gnd EIRP (dBm) | 65.00 | 65.00 | 65.00 |
| Gnd pointing loss (dB) | −0.02 | −0.02 | −0.02 |
| Range @ Elevation Angle (km) | 750 | 18,000 | 2,400 |
| Free Space Loss (dB) | −157.73 | −184.00 | −167.84 |
| Atmospheric Loss (dB) | −0.1 | −0.1 | −0.1 |
| RIP @ Spacecraft Antenna (dBm) | −92.85 | −119.12 | −102.96 |
| Spacecraft Antenna Gain (dBi) | 5 | 5 | 5 |
| Spacecraft Receiver Sensitivity (dBm) | −95 | −121 | −105 |
| Basic Link Margin | 7.15 | 6.88 | 7.04 |
| Polarization Loss (dB max.) | −1.26 | −1.26 | −1.26 |
| Pointing Loss (dB) | −1 | −1 | −1 |
| R1, Rain Loss (dB) | 0 | 0 | 0 |
| Modulation Loss (dB) | 0.00 | 0.00 | 0.00 |
| Implementation Loss (dB) | −2 | −2 | −2 |
| Total Loss (dB) | −4.26 | −4.26 | −4.26 |
| Resultant Link Margin (dB) | 2.89 | 2.62 | 2.78 |

The table confirms that the links with the greatest receiver sensitivity also have the longest range. What is most interesting is the spread between the theoretical range and the typical range for each standard. Better engineering of receiver front-ends or the use of low-noise preamplifiers can improve the performance by moving the range from the typical toward the maximum values. So the spread represents the level of improvement that is available for increasing range. The primary FOM is the range values and WCDMA is at the top, followed by 802.15.4 and finally 802.11b. The goal is to support 1200 Km links, which can be achieved at low data rates using ZigBee or WCDMA, but not WiFi. Only WiFi engineered to improve receiver input sensitivity could meet this goal.

The Space-to-Space link margin calculations are the same as the Space-to-Ground case, but with a much lower gain antenna combination using the 5 dBi patch to 5 dBi patch antennas. The range is reduced to only a few dozen kilometers. Again, the results as shown in the table below conform to the earlier results, with WCDMA being the best. The most representative FOM is the Typical Range available, but the table lists the Maximum Range and the Specified Range for completeness. Only WCDMA and ZigBee can meet the range objective.

TABLE 21

Space-to-Ground and Space-to-Space Range.

| Range from Link Margin | WiFi | WCDMA | ZigBee |
|---|---|---|---|
| S-G Max Range - Km | 3500 | 35000 | 7000 |
| S-G Typical Range | 750 | 17500 | 1050 |
| S-G Specified Range | 130 | 17500 | 230 |
| S-S Max Range | 120 | 1250 | 240 |
| S-S Typical Range | 24 | 550 | 33 |
| S-S Specified Range | 4 | 350 | 7 |

F. Figures of Merit

Comparing these wireless network standards is like comparing apples and oranges as each one is intended for a different purpose with certain features that cannot be directly compared. Therefore Figures of Merit (FOM) will be used to help define the specific trades involved with choosing the right standard for the intended mission. Certain figures such as range, link margin and data rate are quantitative, while the others such as SWAP are qualitative. Key qualitative FOMs are the connection models supported by the standard, the availability of hardware and software components and other features. Licensed spectrum is also an attribute of relevance.

TABLE 22

Quantitative Figures of Merit Comparison.

| FOM | WiFi | WCDMA | ZigBee |
|---|---|---|---|
| S-G Range (Km) | 130-3500 | 5000-35000 | 230-7000 |
| S-S Range (Km) | 4-120 | 10-1250 | 7-240 |
| User Data Rate (Kbps) | 500-5,000 | 12-160 | 120 |

One desires maximum link margin at minimum transmit-mode power consumption for highest efficiency. The link margin calculations show that WCDMA is the most effective method in terms of PHY layer performance, mostly due to its low data rate. It will easily meet the 1200 Km range requirement. Note that carrying higher-rate data will make the WCDMA ranges similar to WiFi as represented by the lowest numbers for WCDMA. Neither WiFi nor ZigBee will typically attain the 1200 Km range required, but with a low-noise pre-amplifier or better chipset it should be just possible to meet the goal. Note that the higher data rates such as 802.11b at 11 Mbps, 802.11g or 802.11n would not work at this range.

Another key FOM is the overall data throughput that can be supported. WiFi supports the greatest data rate, with ZigBee and WCDMA providing similar data rates. Note that the impact of higher data rate on link margin is significant, lowering range greatly. For example, WCDMA will perform similarly to ZigBee if providing data at 384 Kbps.

TABLE 23

Qualitative Figures of Merit Comparison.

| FOM Description | WiFi | WCDMA | ZigBee |
|---|---|---|---|
| Topology | P2P/Star | Star | Tree |
| Routing | No | No | Mesh |
| Authentication | Yes | Yes | Yes |
| Encryption | Yes | Yes | Yes |
| TCP/IP support | Yes | No | No |
| Cost | Low | High | Med |
| Open-source SW | Yes | No | No |
| Automation | Pointing | Sector | Pointing |
| Duty Cycle Limit | Med | Med | Low |
| Interference Rejection | High | Med | Med |
| Licensed spectrum | No | Yes | No |
| Power Draw | Med | Med | Low |
| Volume | Low | Med | Low |
| Mass | Low | Med | Low |

The qualitative FOMs allow capturing features that cannot be expressed or compared quantitatively, but that are also important for trade studies. Open-source MAC software appears to be only available for WiFi currently. This favors WiFi in terms of component availability. The Z-stack or comparable software framework for ZigBee is a licensed software product, but allows user access to low-level features. One often gets the development license at low cost. The cost of WCDMA software is unknown and given the complexities of the MAC layer, the highest cost is probably the learning curve.

All networks discussed support secure authentication and link encryption of varying quality. It is important for all satellite links to have at least a basic level of security and most standards incorporate the basics.

WiFi and WCDMA support star networks, while ZigBee supports tree networks. Tree networks are supersets of star networks. There is difficulty implementing S-S links with WCDMA, as the connection protocol is complex and generally relies on a high-performance base station, hard to implement on spacecraft. Therefore this standard is best for S-G. If multiple spacecraft are in the beamwidth at the same time, then the ground station acting as the hub for the star can communicate with multiple spacecraft simultaneously. For WiFi in infrastructure mode, this can also be used for very effective space-to-space communications, but only while multiple spacecraft are in the ground station beam.

The routing capability is important because mesh routing, where intermediate nodes automatically forward data to an outlying node, can greatly increase effective range by using a number of hops. In this case, ZigBee incorporating mesh routing at the MAC layer is the clear winner. The others do not incorporate any routing features in their MAC layers. However, routing is often accomplished at the network protocol layer or even in the application layer. Solutions such as Delay Tolerant Networking (DTN) can be used with any of the communications links.

Two types of ground station automation are considered: the first is using electromechanical actuators to physically point the antenna using a-priori knowledge of spacecraft orbit. This is similar to the method used for most ground stations, but substitutes control loops and computers for the human team. Many such ground stations are available, although few used for small satellites due to cost. The WCDMA technology presents an interesting ground station automation solution. Since cell phone towers already steer the RF energy to multiple sector antennas located around the tower, this technology already supports antenna beam steering using an array. This eliminates the mechanical aspects of automating ground stations, and in addition this approach does not require orbital knowledge. The spacecraft sends a signal to the ground station, which automatically selects the correct sector to use.

The duty cycle for communications is another FOM of particular importance to small satellites, where power consumption is the major operating constraint. ZigBee node can sleep once a network is formed, waking for only the time needed to send a data packet. This results in extremely low duty cycles for transmission, which lowers power consumption significantly and is another major factor favoring ZigBee. The other two standards require connection management (create or re-initiate a connection) prior to sending a data packet. This connection management can actually consume quite a number of cycles and packets and could actually cost more power than the actual data transmission. Both WCDMA and WiFi protocols assume the node is always powered up and able to respond to beacons. While WiFi and cell phones can sleep, they actually have to reconnect to the network after waking.

Interference rejection is important for concurrent use of communications links or operation in noisy environments. All three standards do well in this regard due to the use of spread-spectrum modulation, with WiFi having the best rejection. Spectrum management is another FOM. The use of ISM bands allows Universities to operate ground stations without a license, but different rules apply for different operators. For example, the carrier frequency for ISM standards can be shifted to a licensed S-band supporting a broader range of missions such as those operated by the US Government. For certain chipsets, this might be as easy as shifting the basic clock frequency. WCDMA uses the 1.9 and 2.1 GHz licensed spectrum set aside for cell phone use. Therefore this standard would require the use of licensed spectrum, and this is probably owned by an entity with terrestrial interests, not necessarily interested in allocating a portion to HSN. In fact, potential interference with cell phone networks is probably a significant issue.

The availability of components and software often drives cost. The lowest cost solutions are also the most commonly used but have the lowest overall performance. The WCDMA hardware could be affordable if one uses a cell phone tower development environment to adapt the system to HSN use. Most solutions are very low SWAP, consisting of a couple of chips and the antenna.

G. Conclusion

The analysis was consistent in terms of expected performance and resultant FOMs provided by each standard. The standards were chosen to fit broad anticipated mission needs, so any of the standards could be applied to actual mission designs, but the analysis shows that certain standards work best for specific types of missions. For example, if a mission needs longer range, but requires relatively low data rates, then WCDMA is the best choice. For closely coupled clusters of satellites requiring significant information exchange, the use of WiFi networks would be best. The respective trade-offs are also important, with the WCDMA solution requiring the most development and the WiFi solution requiring the most on-board power.

The PHY Layers of each standard are similar with WCDMA providing the best performance in terms of range, mostly due to low data rate and limited spreading. WiFi provides the best performance for high data rates. ZigBee fits very well into small sat missions with many spacecraft where mesh routing can improve range significantly. The most intriguing result was the consistency of the PHY layer analysis. For a given data rate, the range would be similar, due to the similarity of the spread spectrum techniques.

The MAC Layers differ significantly, with WiFi supporting both star and P2P topologies. The persistent network connections offered by WiFi is useful for closely coupled clusters where high data rate contributes to overall performance. WCDMA only supports star configurations due to its dependence upon a central node and this limits it to S-G use. Zigbee networks support ad-hoc dynamic tree configurations and this is considered a key advantage for complex missions consisting of many spacecraft. The ZigBee protocol supports very low duty cycles, which makes it the ideal choice for sending small amounts of data at periodic intervals from very small spacecraft.

In the short term, WiFi can work for small constellations with the appropriate adjustments to PHY and MAC layer. In the longer term, self-configuring networks will provide significant advantages. The use of cell phone technology for implementing the S-G link is particularly attractive due to its high performance and the potential of using switched sector antennas to implement an automatic ground station requiring very little human intervention, a key attribute for HSN.

All references cited herein are expressly incorporated by reference in their entirety. It will be appreciated by persons skilled in the art that the present invention is not limited to what has been particularly shown and described herein above. A variety of modifications and variations are possible in light of the above teachings without departing from the scope and spirit of the invention, which is limited only by the following claims.

What is claimed is:

1. A heterogeneous spacecraft network comprising:
   first and second space segments each having a communication system, the communication systems of the space segments being incompatible with each other, the incompatible communication systems of the space segments do not permit communication between the space segments;
   first and second operations centers each having a communication system, the communication system of the first operations center being compatible with the communication system of the first space segment, the communication system of the second operations center being compatible with the communication system of the second space segment, the communication systems of the first and second operations centers being incompatible with each other;
   a plurality of data user communities;
   a network management architecture to facilitate communication between the first and second operations centers and the plurality of data user communities.

2. The network of claim 1 wherein the network management architecture includes a standardized communication system capable of facilitating communication between the first and second operations centers.

3. The network of claim 2 wherein at least one of the first and second space segment includes a spacecraft, a constellation of spacecraft, a formation flight of spacecraft, or a swarm of spacecraft.

4. The network of claim 3 wherein the standardized communication system of the network management architecture is capable of facilitating communication between the first and second space segments via the first and second operations centers.

5. The network of claim 4 wherein the standardized communication system uses WiFi based on the IEEE 802 family of network standards.

6. The network of claim 5 wherein at least one of the first and second space segments includes a WiFi transceiver.

7. The network of claim 6 wherein the first and second operations centers include a mission operations center and a science operations center.

8. The network of claim 7 wherein the standardized communication system of the network management architecture is capable of facilitating communication between the mission operations center and the science operations center.

9. The network of claim 6 wherein at least one of the first and second operations centers includes a WiFi transceiver.

10. The network of claim 9 wherein the network management architecture facilitates communication between the WiFi transceivers of the at least one of the first and second space segments and the at least one of the mission operations center and the science operations center.

11. The network of claim 6 wherein the at least one of the first and second space segments includes a WiFi transceiver and an S-band transceiver.

12. The network of claim 6 wherein the WiFi transceiver includes a link range between space and ground of 3100 km and includes a link range between space and space of 550 km.

13. A method of communication for a heterogeneous spacecraft network, the method comprising:
   transmitting data from a first space segment to a first ground segment;
   transmitting the data from the first ground segment to a network management architecture;
   transmitting data from a second space segment to a second ground segment, the second space and ground segments having incompatible communication systems with the first space and ground segments;
   transmitting the data from the second ground station to the network management architecture; and
   transmitting data from the network management architecture to a plurality of data user communities.

14. The method of claim 13 wherein the space segments include a spacecraft, a constellation of spacecraft, a formation flight of spacecraft, or a swarm of spacecraft.

15. The method of claim 14 wherein the ground segments include a mission operations center, a science operations center, or a ground station.

16. A method of communication for a heterogeneous spacecraft network, the method comprising:
   transmitting data from a first space segment to a second space segment using WiFi based on the IEEE 802 family of network standards;
   transmitting the data from the second space segment to a ground segment using WiFi based on the IEEE 802 family of network standards, the data from the first space segment not being transmitted directly to the ground segment due to incompatible communication systems;
   transmitting the data from the ground station to a network management architecture; and,
   transmitting the data from the network management architecture to a plurality of data user communities.

17. The method of claim 16 wherein the space segments include a spacecraft, a constellation of spacecraft, a formation flight of spacecraft, or a swarm of spacecraft.

18. The method of claim 17 wherein the ground segments include a mission operations center, a science operations center, or a ground station.

* * * * *